United States Patent
Kanazawa et al.

(10) Patent No.: US 9,595,734 B2
(45) Date of Patent: Mar. 14, 2017

(54) NON-AQUEOUS LIQUID ELECTROLYTE FOR SECONDARY BATTERY AND SECONDARY BATTERY

(71) Applicant: FUJIFILM Corporation, Minato-ku, Tokyo (JP)

(72) Inventors: Yoshinori Kanazawa, Kanagawa (JP); Tatsuya Igarashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 308 days.

(21) Appl. No.: 14/262,347

(22) Filed: Apr. 25, 2014

(65) Prior Publication Data

US 2014/0234729 A1 Aug. 21, 2014

Related U.S. Application Data

(63) Continuation of application No. PCT/JP2012/076845, filed on Oct. 17, 2012.

(30) Foreign Application Priority Data

Oct. 28, 2011 (JP) ................. 2011-237989
Oct. 28, 2011 (JP) ................. 2011-237990
Oct. 28, 2011 (JP) ................. 2011-237991

(51) Int. Cl.
*H01M 10/0567* (2010.01)
*H01M 10/0569* (2010.01)
*H01M 10/0525* (2010.01)
*H01M 4/485* (2010.01)

(52) U.S. Cl.
CPC ....... *H01M 10/0525* (2013.01); *H01M 4/485* (2013.01); *H01M 10/0567* (2013.01); *H01M 10/0569* (2013.01); *H01M 2300/0025* (2013.01); *Y02E 60/122* (2013.01)

(58) Field of Classification Search
CPC ......... H01M 10/0525; H01M 10/0566; H01M 10/0567
See application file for complete search history.

(56) References Cited

U.S. PATENT DOCUMENTS

| | | | |
|---|---|---|---|
| 4,448,728 A * | 5/1984 | Jullien et al. ................. | 558/434 |
| 2005/0136328 A1* | 6/2005 | Eylem et al. ................. | 429/220 |
| 2006/0035155 A1* | 2/2006 | Tamura et al. ............... | 429/339 |
| 2006/0199080 A1 | 9/2006 | Amine et al. | |
| 2007/0281211 A1* | 12/2007 | Zhang et al. ............. | 429/231.1 |
| 2008/0241704 A1 | 10/2008 | Abe et al. | |
| 2010/0099031 A1 | 4/2010 | Kato et al. | |
| 2012/0088160 A1* | 4/2012 | Zhang et al. ............. | 429/328 |
| 2013/0052543 A1* | 2/2013 | Ihara et al. ................. | 429/337 |
| 2013/0089778 A1* | 4/2013 | Ihara ................. | H01M 10/0569 429/200 |
| 2015/0051247 A1* | 2/2015 | Meroueh ......... | 514/321 |
| 2015/0188193 A1* | 7/2015 | Kodama et al. | |

FOREIGN PATENT DOCUMENTS

| | | |
|---|---|---|
| JP | 06-279647 A | 10/1994 |
| JP | 2001-155772 A | 6/2001 |
| JP | 2007-265858 A | 10/2007 |
| JP | 2007-299541 A | 11/2007 |
| JP | 2008-532248 A | 8/2008 |
| JP | 2008-262901 A | 10/2008 |
| JP | 2008-269982 A | 11/2008 |
| WO | 2005/091422 A1 | 9/2005 |
| WO | 2006/070546 A1 | 7/2006 |
| WO | WO 2011/070964 * | 6/2011 |

OTHER PUBLICATIONS

Communication dated Mar. 17, 2015 from the Japanese Patent Office in counterpart Application No. 2012-214026.
International Search Report of PCT/JP2012/076845 dated Jan. 8, 2013.

* cited by examiner

*Primary Examiner* — Anca Eoff
(74) *Attorney, Agent, or Firm* — Sughrue Mion, PLLC

(57) ABSTRACT

A non-aqueous liquid electrolyte for a secondary battery, containing an electrolyte, and at least one or more cyclopropane compound selected from the group consisting of a compound represented by the following formula (I-1), a compound represented by the following formula (II-1), and a compound represented by the following formula (III-1) in an organic solvent,

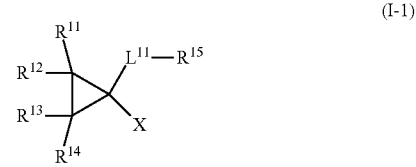

(I-1)

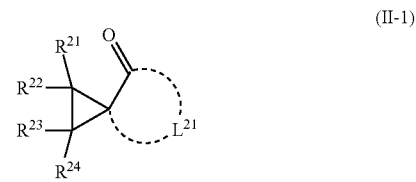

(II-1)

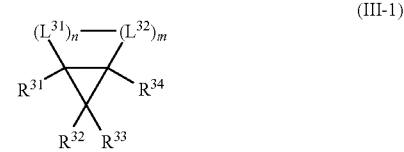

(III-1)

wherein $R^{11}$ to $R^{15}$, $R^{21}$ to $R^{24}$ and $R^{31}$ to $R^{34}$ represent a hydrogen or a specific substituent; $L^{11}$, $L^{21}$, $L^{31}$ and $L^{32}$ represent a specific linking group; X represents an electron-withdrawing group; and n and m each independently represent 1 or 2.

14 Claims, 3 Drawing Sheets

NON-AQUEOUS LIQUID ELECTROLYTE FOR SECONDARY BATTERY AND SECONDARY BATTERY

CROSS-REFERENCE TO RELATED APPLICATIONS

This application is a continuation of PCT/JP2012/076845 filed on Oct. 17, 2012 which claims benefit of Japanese Patent Application No. 2011-237989 filed on Oct. 28, 2011, Japanese Patent Application No. 2011-237990 filed on Oct. 28, 2011, and Japanese Patent Application No. 2011-237991 filed on Oct. 28, 2011, the subject matters of which are incorporated herein by reference in their entirety.

FIELD OF THE INVENTION

The present invention relates to a non-aqueous liquid electrolyte for a secondary battery containing an organic solvent, and a secondary battery using the same.

BACKGROUND OF THE INVENTION

Secondary batteries called lithium ion batteries, currently attracting attention, can broadly be classified into two categories of so called lithium ION secondary batteries and lithium METAL secondary batteries. The lithium METAL secondary batteries utilize precipitation and dissolution of lithium for the operation. Besides, the lithium ION secondary batteries utilize storage and release of lithium in the charge-discharge reaction. These batteries both can provide large energy densities as compared with lead batteries or nickel-cadmium batteries. By making use of this characteristic, in recent years, these batteries have been widely distributed as power supplies for portable electronic equipment such as camera-integrated VTR's (video tape recorders), mobile telephones, and notebook computers. Under the circumstance, the development of lithium ion secondary batteries is progressed, particularly for providing lightweight products with achieving high energy densities. Furthermore, there is a strong demand for size reduction, weight reduction, service life prolongation, and safety enhancement.

Regarding a liquid electrolyte for lithium ion secondary batteries or lithium metal secondary batteries (hereinafter, these may be collectively referred to simply as a lithium ion secondary battery), in order to realize high electric conductivity and potential stability, a particular combination of materials has widely been employed. That is, a carbonic acid ester-based solvent such as propylene carbonate or diethyl carbonate is employed, in combination with an electrolyte salt such as lithium hexafluorophosphate.

As an example of improving the liquid electrolyte in terms of the components thereof, particular cyclic compounds have been applied in order to suppress an increase in the internal resistance at the time of a high temperature (80° C.) (see Patent Literature 1). Furthermore, in a specialized cell having a film of polyvinylidene fluoride formed on the electrodes, gas generation at the time of discharge can purportedly be suppressed by adding an acid anhydride to the liquid electrolyte (see Patent Literature 2).

CITATION LIST

Patent Literatures

Patent Literature 1: JP-A-2007-265858 ("JP-A" means unexamined published Japanese patent application)
Patent Literature 2: JP-A-2001-155772

SUMMARY OF THE INVENTION

Problems that the Invention is to Solve

The requirement has been increasingly arisen, in these days, for the enhancement of the performance of secondary batteries. Taking the requirement into consideration, it still cannot be said that the technologies of the patent documents mentioned above are sufficient, as ascertained by the present inventors (see the comparative examples described below). The enhancement in performance is thus desired for achieving better performance, comprehensively, in terms of plural evaluation items.

The present invention was made in view of such circumstances. The present invention thus addresses the provision of a non-aqueous liquid electrolyte for a secondary battery and a secondary battery using it, which can exhibit high performance in cycle characteristics and low temperature discharge rate, further being excellent in high temperature storability (if necessary, including discharging-charging properties at higher rates) that is related to positive electrode characteristics.

Means to Solve the Problem

The above-described problems of the present invention were solved by the following means.
(1) A non-aqueous liquid electrolyte for a secondary battery, containing:
an electrolyte;
at least one or more cyclopropane compound selected from the group consisting of a compound represented by the following formula (I-1), a compound represented by the following formula (II-1), and a compound represented by the following formula (III-1) in an organic solvent,

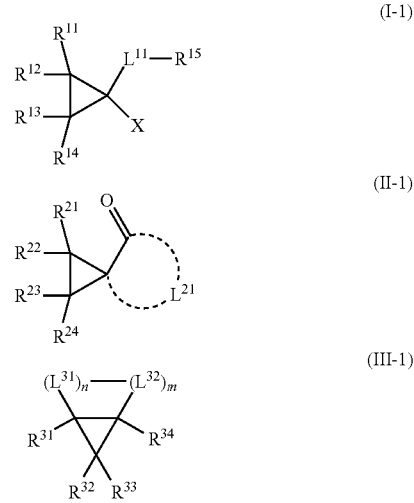

wherein, in formula (I-1), $R^{11}$ to $R^{14}$ each independently represent a hydrogen atom, an alkyl group, an aryl group, an alkoxy group, a fluorine atom, a group containing an carbonyl group, or a cyano group; $R^{15}$ represents a substituent having 1 to 7 carbon atoms which may have an oxygen atom, an nitrogen atom, or a sulfur atom; $L^{11}$ represents an alkylene group or a carbonyl group; X represents an electron-withdrawing group having a Hammett substituent constant $\sigma_p$ value of 0 or more;

wherein, in formula (II-1), $R^{21}$ to $R^{24}$ each independently represent a hydrogen atom or a substituent; and $L^{21}$ represents a group of atoms for forming a ring structure with a carbonyl group and a carbon atom of a cyclopropyl group; and wherein, in formula (III-1), $R^{31}$ to $R^{34}$ each independently represent a hydrogen atom or a substituent; $L^{31}$ represents an oxygen atom, $-NR^{35}-$, or a carbonyl group; $L^{32}$ represents an alkylene group, an oxygen atom, a sulfur atom, $-SO_2-$, or $-NR^{35}-$; $R^{35}$ represents an alkyl group or an aryl group; and n and m each independently represent 1 or 2.

(2) The non-aqueous liquid electrolyte for a secondary battery described in item (1), wherein the substituent X in formula (I-1) represents a cyano group, an alkoxycarbonyl group, or a carbamoyl group.

(3) The non-aqueous liquid electrolyte for a secondary battery described in item (1) or (2), wherein $R^{11}$ to $R^{14}$ in formula (I-1) represent a hydrogen atom.

(4) The non-aqueous liquid electrolyte for a secondary battery described in any one of items (1) to (3), wherein the substituent X in formula (I-1) represents a cyano group.

(5) The non-aqueous liquid electrolyte for a secondary battery described in any one of items (1) to (4), wherein $-L^{11}-R^{15}$ in formula (I-1) represents $-COOR^{16}$, and wherein $R^{16}$ represents an alkyl group having 1 to 6 carbon atoms, in which a carbonyl group ($-CO-$), an ether group ($-O-$) or an imino group ($-NR^{17}-$) may intervene; and $R^{17}$ represents a hydrogen atom or an alkyl group.

(6) The non-aqueous liquid electrolyte for a secondary battery described in item (1), wherein a ring constituted by $L^{21}$ in formula (II-1) contains $-CONR^{25}-$ or $-COO-$, and wherein $R^{25}$ represents an alkyl group or an aryl group.

(7) The non-aqueous liquid electrolyte for a secondary battery described in item (1) or (6), wherein the compound represented by formula (II-1) is a compound represented by the following formula (II-2):

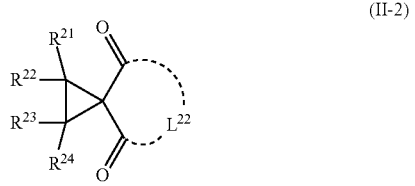

wherein $R^{21}$ to $R^{24}$ have the same meanings as those of formula (II-1); and $L^{22}$ represents a group of atoms for forming a ring structure with two carbonyl groups and a carbon atom of a cyclopropyl group.

(8) The non-aqueous liquid electrolyte for a secondary battery described in any one of items (1), (6) and (7), wherein a ring constituted by $L^{21}$ in formula (II-1) or a ring constituted by $L^{22}$ in formula (II-2) is a 5- or 6-membered ring.

(9) The non-aqueous liquid electrolyte for a secondary battery described in item (1), wherein a linking group of $(L^{31})n$ in formula (III-1) is a carbonyloxy group, an amide group, or $-COR^{36}-$; and $R^{36}$ represents an alkylene group having 1 to 3 carbon atoms.

(10) The non-aqueous liquid electrolyte for a secondary battery described in any one of items (1) or (9), wherein $L^{32}$ in formula (III-1) is an alkylene group, an oxygen atom, a sulfur atom, or $-NR^{35}-$.

(11) The non-aqueous liquid electrolyte for a secondary battery described in any one of items (1), (9) and (10), wherein the compound represented by formula (III-1) is a compound represented by the following formula (III-2) or (III-3):

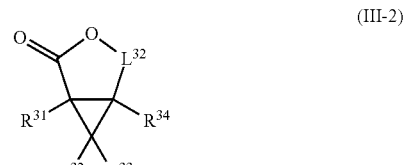

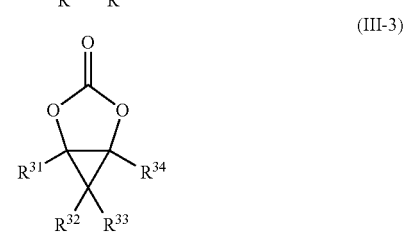

wherein, in formulae (III-2) and (III-3), $R^{31}$ to $R^{34}$ and $L^{32}$ have the same meanings as those of formula (III-1).

(12) The non-aqueous liquid electrolyte for a secondary battery described in any one of items (1) and (9) to (11), wherein $L^{32}$ in formula (III-1) is an alkylene group having 1 to 3 carbon atoms.

(13) The non-aqueous liquid electrolyte for a secondary battery described in any one of items (1) and (9) to (12), wherein $L^{32}$ in formula (III-1) is a methylene group.

(14) The non-aqueous liquid electrolyte for a secondary battery described in any one of items (1) to (13), wherein the electrolyte is a lithium salt.

(15) The non-aqueous liquid electrolyte for a secondary battery described in any one of items (1) to (14), wherein the cyclopropane compound is applied in an amount in the range of 0.005% to 20% by mass relative to the total amount of the liquid electrolyte.

(16) The non-aqueous liquid electrolyte for a secondary battery described in any one of items (1) to (15), wherein a cyclic carbonate, a chain-like carbonate, or a cyclic ester is employed as the organic solvent.

(17) A lithium secondary battery, containing:
the non-aqueous liquid electrolyte for a secondary battery described in any one of items (1) to (16);
a positive electrode; and
a negative electrode.

(18) The secondary battery described in item (17), wherein lithium titanate is applied as an active material for the negative electrode.

(19) A kit of a non-aqueous liquid electrolyte for a secondary battery, using a first agent and a second agent in mixture,
wherein the first agent contains an electrolyte, and the second agent contains a cyclopropane compound represented by the following formula (I-1), formula (II-1) or formula (III-1).

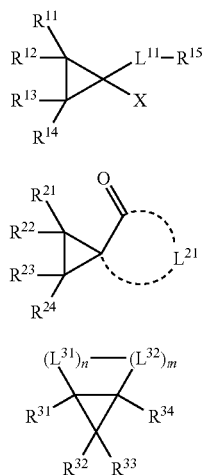

(I-1)

(II-1)

(III-1)

wherein, in formula (I-1), $R^{11}$ to $R^{14}$ each independently represent a hydrogen atom, an alkyl group, an aryl group, an alkoxy group, a fluorine atom, a group containing an carbonyl group, or a cyano group; $R^{15}$ represents a substituent having 1 to 7 carbon atoms which may have an oxygen atom, an nitrogen atom, or a sulfur atom; $L^{11}$ represents an alkylene group or a carbonyl group; X represents an electron-withdrawing group having a Hammett substituent constant $\sigma_p$ value of 0 or more;

wherein, in formula (II-1), $R^{21}$ to $R^{24}$ each independently represent a hydrogen atom or a substituent; and $L^{21}$ represents a group of atoms for forming a ring structure with a carbonyl group and a carbon atom of a cyclopropyl group; and wherein, in formula (III-1), $R^{31}$ to $R^{34}$ each independently represent a hydrogen atom or a substituent; $L^{31}$ represents an oxygen atom, —$NR^{35}$—, or a carbonyl group; $L^{32}$ represents an alkylene group, an oxygen atom, a sulfur atom, —$SO_2$—, or —$NR^{35}$—; $R^{35}$ represents an alkyl group or an aryl group; and n and m each independently represent 1 or 2.

Effects of the Invention

The non-aqueous liquid electrolyte for a secondary battery of the present invention and a secondary battery using the non-aqueous liquid electrolyte exhibit high performance for cycle characteristics and a low temperature discharge rate, further being excellent in high temperature storability (if necessary, including discharging-charging properties) that is related to positive electrode characteristics.

Other and further features and advantages of the invention will appear more fully from the following description, appropriately referring to the accompanying drawings.

MODE FOR CARRYING OUT THE INVENTION

Figure 1:
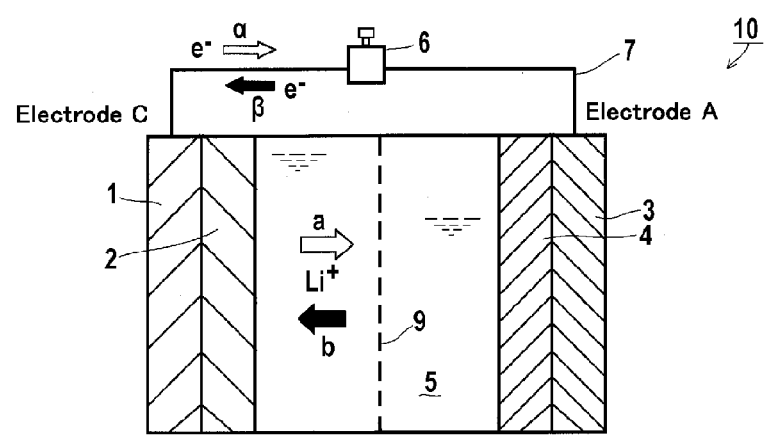
FIG. 1 is a cross-sectional diagram illustrating a mechanism of a lithium ion secondary battery according to an embodiment of the present invention, by modeling.

Hereinafter, preferable embodiments I to III are described, respectively. Meanwhile, the present embodiments I to III share special technical features that are identical with or equivalent to each other, and constitute a single general inventive concept.

Embodiment I

In a non-aqueous liquid electrolyte of the present embodiment, a particular cyclopropane compound is incorporated into a liquid electrolyte. Thereby, when the non-aqueous liquid electrolyte is applied to a secondary battery, the general performance is enhanced, and load characteristics for a positive electrode can also be enhanced. The reason for this is not clearly known, but is speculated as follows. The cyclopropane compound used in the present embodiment has a particular substituent X. It is speculated that this group has properties of withdrawing electrons, and the action of this group makes the cyclopropane ring easy to undergo appropriate ring-opening, thereby promoting the production of a polymer that brings a satisfactory action at the electrode surface or in the vicinity thereof. Furthermore, it is speculated that the particular substituent (-$L^{11}$-$R^{15}$) that is substituted at the same carbon atom as that for these groups also functions favorably, and electrode characteristics of a negative electrode as well as the positive electrode have been ameliorated. That is, it is contemplated that a cyclopropane ring of a particular cyclopropane compound is ring-opened, a polymer of a more desirable from for the positive electrode and the negative electrode is produced to form a SEI (Solid Electrolyte Interface), and this leads to an enhancement of the general performance for a secondary battery.

[Compound Represented by Formula (I-1)]

The non-aqueous liquid electrolyte for a secondary battery of the present embodiment contains a particular cyclopropane compound represented by the following formula (I-1).

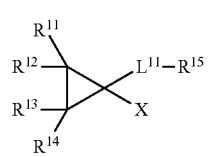

(I-1)

$R^{11}$ to $R^{14}$

In formula (I-1), $R^{11}$ to $R^{14}$ each independently represent a hydrogen atom, an alkyl group, an aryl group, an alkoxy group, a fluorine atom, a group containing a carbonyl group, or a cyano group. Specific examples of the alkyl group, the aryl group and the alkoxy group include the examples of substituent T that will be described below. In addition, $R^{11}$ to $R^{14}$ may bind to each other, or fused together, to form a ring structure. Furthermore, $R^{11}$ to $R^{14}$ may further have a substituent, and the examples of substituent thereof include the examples of substituent T that will be described below.

Among them, $R^{11}$ to $R^{14}$ preferably represent a hydrogen atom.

$R^{15}$ $R^{15}$ represents a substituent having 1 to 7 carbon atoms, preferably a substituent having 1 to 5 carbon atoms. Rb may be a hydrocarbon substituent composed of carbon atoms and hydrogen atoms only, but may also be a substituent containing O, N or S. $R^{15}$ may be linear or may be branched, and may be cyclic or chain-like. Furthermore, $R^{15}$ may be composed of saturated bonds only, or may have unsaturated bonds. In a case where $R^{15}$ is cyclic, the ring may be an aromatic ring, an aliphatic ring, an aromatic heterocyclic ring, or an aliphatic heterocyclic ring. In a case where $R^{15}$ contains O, N or S, examples of an atomic group containing O include an ether group (—O—), a carbonyl group (—CO—), and a carbonyloxy group (—COO—). Examples of an atomic group containing N include an imino group (—NR$^{17}$—; wherein $R^{17}$ represents a hydrogen atom or an alkyl group, and a preferred range will be described below), and an amide group (—CONR$^{17}$—). Examples of an atomic group containing S include a thioether group (—S—), a thiocarbonyl group (—CS—), —CSO—, and —CSS—.

$L^{11}$ $L^{11}$ represents an alkylene group (preferably having 1 to 3 carbon atoms) or a carbonyl group. An alkylene group may have a substituent, and examples of substituent thereof include the examples of substituent T that will be described below.

X

X represents an electron-withdrawing group. An electron-withdrawing group is a substituent having electron-withdrawing properties in terms of electron effect, and when the substituent constant $\sigma_p$ of Hammett's Rule, which is an index for the electron-withdrawing properties or electron-donating properties of a substituent, is used, an electron-withdrawing group is a substituent having a $\sigma_p$ value of 0 or more. Hammett's rule is a rule of thumb advocated by L. P. Hammett in 1935 for quantitatively considering the affect of substituents on the reaction or equilibrium of benzene derivatives, and the appropriateness thereof has been widely recognized. The substituent constant determined in the Hammett's rule involves $\sigma_p$ value and $\sigma_m$ value. These values can be found in a multiplicity of general publications, and are detailed in, for example, "Lange's Handbook of Chemistry" 12th edition by J. A. Dean, 1979 (Mc Graw-Hill), "Region of Chemistry (Kagaku no Ryoiki)" special issue, No. 122, pp. 96 to 103, 1979 (Nankodo), and Corwin Hansch, A. LEO and R. W. TAFT "A Survey of Hammett Substituent Constants and Resonance and Field Parameters" Chem. Rev. 1991, 91, 165-195. Meanwhile, in the present embodiment, various substituents will be defined or described based on the Hammett substituent constant $\sigma_p$; however, this does not imply that the substituents are limited only to the substituents having values that exist in the literature, which are found in the textbooks described above. It is needless to say that the substituents include those substituents having constant values such that even if the values are not known in the literature, the values will be included in the range when measured based on Hammett's Rule.

The substituent constant $\sigma_p$ value is preferably from 0.1 to 1.0, more preferably from 0.2 to 1.0, and most preferably from 0.3 to 1.0.

Specific examples of the substituent of X include a cyano group (—CN), an alkoxycarbonyl group (—COOR$^{16}$), and a carbamoyl group (—CON(R$^{18}$)$_2$).

$R^{16}$ represents an alkyl group having 1 to 6 carbon atoms, which may be interrupted by a carbonyl group (—CO—), an ether group (—O—) or an imino group (—NR$^{17}$—). Among them, $R^{16}$ is preferably an alkyl group having no heteroatom, and is more preferably a methyl group, an ethyl group, an i-propyl group or a t-butyl group. $R^{16}$ may have a substituent, and examples of the substituent thereof include the examples of substituent T that will be described below.

$R^{17}$ represents a hydrogen atom or an alkyl group. When $R^{17}$ is an alkyl group, $R^{17}$ is preferably an alkyl group having 1 to 4 carbon atoms; and more preferably a methyl group, an ethyl group, an i-propyl group, or a t-butyl group. $R^{17}$ may have a substituent, and examples of the substituent thereof include the examples of substituent T that will be described below.

$R^{18}$ has the same meaning of $R^{17}$.

X is preferably a cyano group (—CN) or alkoxycarbonyl group (—COOR$^{16}$), more preferably a cyano group (—CN).

The $\sigma_p$ values for some of the exemplified substituents will be shown below.

TABLE A

| No. | Substituent | σp |
|---|---|---|
| 1 | CN | 0.66 |
| 2 | COOCH$_3$ | 0.45 |
| 3 | CONH$_2$ | 0.36 |
| 4 | COOC$_6$H$_5$ | 0.44 |

Furthermore, the function of the various substituents or linking groups described above is speculated to be, even though not conclusively, as follows. It is contemplated that when an alkylene group or a carbonyl group is employed as the linking group $L^{11}$, a potential adjusting action works, and film formation can be effectively achieved in the range of the operating potential for a secondary battery. Among them, when $L^{11}$ is a carbonyl group, it is contemplated that the electron-withdrawing properties of the group come to work, and film formability is enhanced. Furthermore, the terminal substituent of $R^{15}$ is speculated to contribute to stabilization of lithium ions in the film thus formed.

Hereinafter, the specific examples of the compound represented by formula (I-1) are described, but the present embodiment is not construed by being limited thereto.

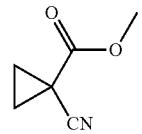

(SI-1)

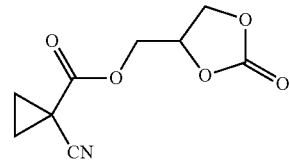

(SI-2)

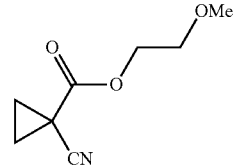

(SI-3)

-continued

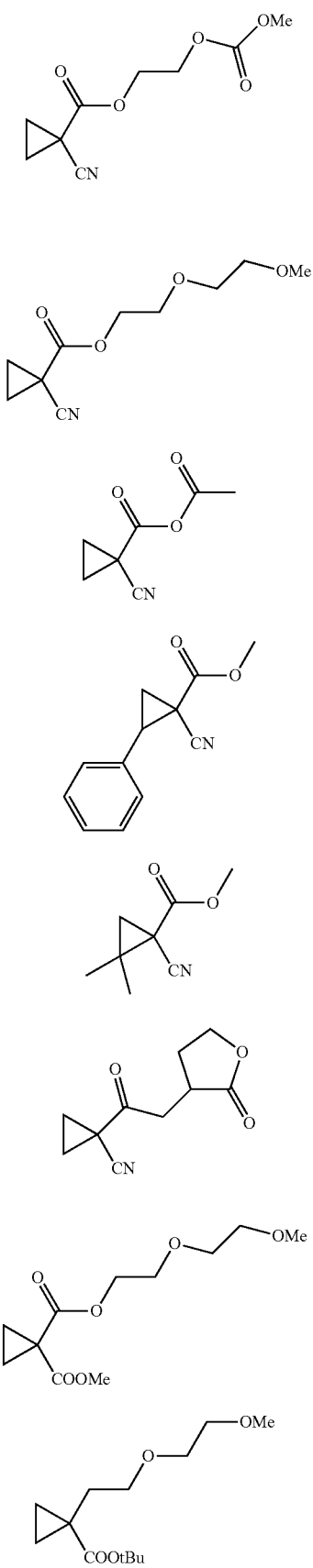

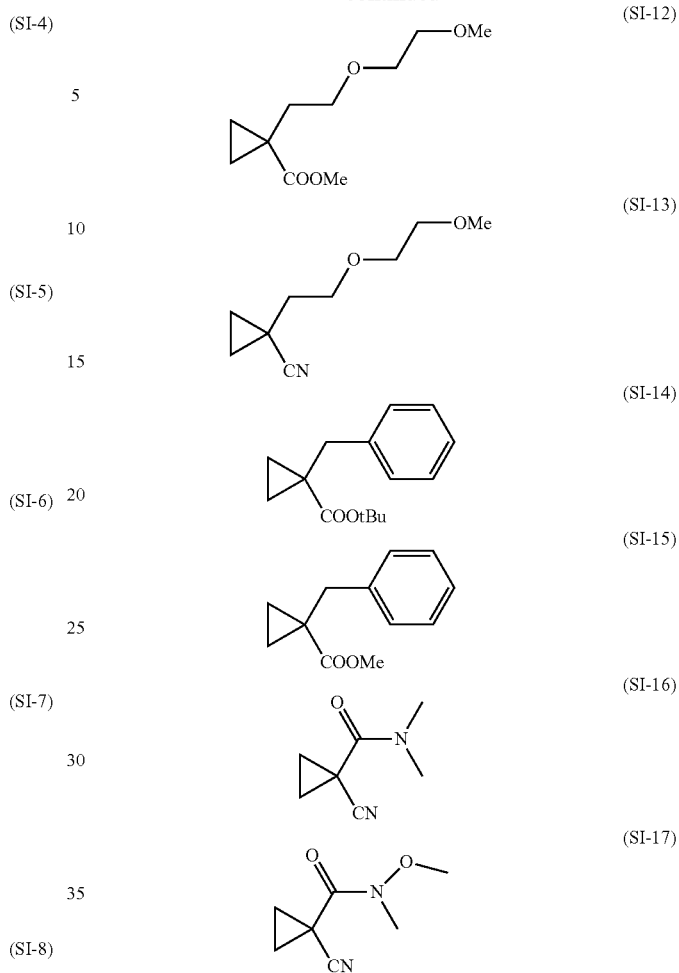

Me: methyl group
tBu: t-butyl group

The compound represented by formula (I-1) can be synthesized according to a conventional method, but specifically, reference can be made to the procedure of the synthetic example described below.

The content of the particular cyclopropane compound represented by formula (I-1) is not particularly limited, but the content is preferably 0.005% to 20% by mass, more preferably 0.01% by mass or more, and particularly preferably 0.05% by mass or more, relative to the total mass of the liquid electrolyte. When the content is adjusted to a value more than or equal to the lower limit, the effect of the present embodiment is sufficiently exhibited, and decomposition of the liquid electrolyte can be suppressed, which is preferable. The upper limit is more preferably 15% by mass or less, and particularly preferably 10% by mass or less. When the content is adjusted to a value less than or equal to the upper limit, excessive addition can be avoided, and the particular cyclopropane compound can be preferably prevented from adversely affecting the battery performance.

Regarding the particular cyclopropane compound represented by formula (I-1), one kind may be used alone, or any two or more kinds may be used in combination.

Embodiment II

In a non-aqueous liquid electrolyte of the present embodiment, a particular cyclopropane compound is incorporated into a liquid electrolyte. Thereby, general performance is enhanced when the liquid electrolyte is applied to a secondary battery, and load characteristics for a positive electrode can also be enhanced. The reason for this is not clearly known, but is speculated as follows. A cyclopropane compound having a spiro-ring structure used in the present embodiment has a carbonyl group next to the cyclopropyl group (α-position). It is contemplated that a carbonyl group has electron-withdrawing properties, and the action of the carbonyl group makes a cyclopropane ring easy to be appropriately ring-opened, thereby promoting the production of an ideal polymer at the electrode surface or in the vicinity thereof. Furthermore, it is speculated that the cyclic structural unit containing the carbonyl group also acts favorably, and ameliorates the electrode characteristics of a negative electrode as well as the positive electrode. That is, it is contemplated that a cyclopropane ring of the particular cyclopropane compound having a spiro-ring structure is ring-opened, a polymer of a more preferred form for the positive electrode and negative electrode is produced to form a SEI (Solid Electrolyte Interface), and this leads to an enhancement of the general performance in a secondary battery.

[Compound Represented by Formula (II-1)]

The non-aqueous liquid electrolyte for a secondary battery of the present embodiment contains a particular cyclopropane compound represented by the following formula (II-1).

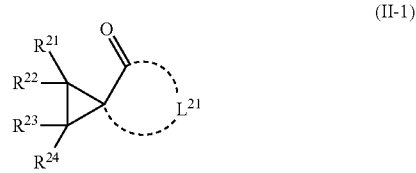

$R^{21}$ to $R^{24}$

In formula (II-1), $R^{21}$ to $R^{24}$ represent a hydrogen atom or a substituent, among them, it is preferable that $R^{21}$ to $R^{24}$ each independently represent a hydrogen atom, an alkyl group, an aryl group, an alkoxy group, a fluorine atom, a group containing a carbonyl group, or a cyano group. Specific examples of the alkyl group, aryl group and alkoxy group include the examples of substituent T that will be described below. In addition, $R^{21}$ to $R^{24}$ may bind to each other, or fused together, to form a ring structure. Furthermore, $R^{21}$ to $R^{24}$ may further have a substituent, and examples of the substituents thereof include the examples of substituent T that will be described below.

Among them, $R^{21}$ to $R^{24}$ preferably represent a hydrogen atom, an alkyl group, a fluorine atom, a group containing an carbonyl group, or a cyano group, and a hydrogen atom and an alkyl group are more preferable.

Examples of the alkyl group include the examples of substituent T that will be described below, but the alkyl group is preferably an alkyl group having 1 to 10 carbon atoms, more preferably an alkyl group having 1 to 7 carbon atoms, and particularly preferably a methyl group, an ethyl group, an isopropyl group, a tertiary butyl group or a benzyl group.

The aryl group is preferably an aryl group having 6 to 26 carbon atoms, and particularly preferably a phenyl group.

The alkoxy group is preferably an alkoxy group having 1 to 20 carbon atoms, more preferably an alkoxy group having 1 to 10 carbon atoms, even more preferably an alkoxy group having 1 to 6 carbon atoms, and particularly preferably a methoxy group, an ethoxy group, an isopropoxy group, or a tertiary butoxy group.

The carbonyl group-containing group is preferably an alkylcarbonyl group, an amide group or an alkxoycarbonyl group, and particularly preferably a methylcarbonyl group, an ethylcarbonyl group, a methoxycarbonyl group, an ethoxycarbonyl group, an isopropoxycarbonyl group, or a tertiary butoxycarbonyl group.

$L^{21}$ $L^{21}$ represents a group of atoms for forming a ring structure with the carbon atom of the cyclopropyl group and the carbonyl group. The ring constituted by $L^{21}$ may be any of an aromatic hydrocarbon ring, an aliphatic hydrocarbon ring, an aromatic heterocyclic ring, and an aliphatic heterocyclic ring, but the ring is preferably a heterocyclic ring (aromatic heterocyclic ring and aliphatic heterocyclic ring), and more preferably an aliphatic heterocyclic ring. There are no particular limitations on the heteroatom that constitutes the heterocyclic ring, but examples include an oxygen atom, a nitrogen atom, and a sulfur atom, and the heteroatom is preferably an oxygen atom or a nitrogen atom. A ring constituted by $L^{21}$ may have a substituent, and examples of the substituent thereof include the examples of substituent T that will be described below. Meanwhile, the aliphatic hydrocarbon ring and the aliphatic heterocyclic ring may contain unsaturated bonds.

Regarding $L^{21}$, it is preferable that the ring that is formed thereby together with the carbon atoms of the cyclopropyl group and the carbonyl group (C=O) in the formula contain —CONR$^{25}$— or —COO—. Herein, $R^{25}$ represents an alkyl group (preferably an alkyl group having 1 to 5 carbon atoms) or an aryl group (preferably an aryl group having 6 to 24 carbon atoms). Specific examples of the alkyl group or the aryl group herein are the examples of substituent T that will be described below. $R^{25}$ may further have a substituent, and examples of the substituent thereof include the examples of substituent T that will be described below.

The compound represented by formula (II-1) is preferably a compound represented by the following formula (II-2).

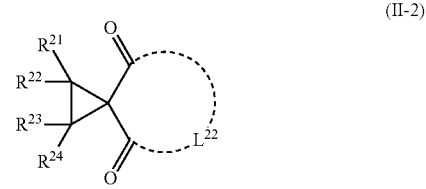

$R^{21}$ to $R^{24}$ $R^{21}$ to $R^{24}$ have the same meanings as those of formula (II-1).

$L^{22}$

In formula (II-2), $L^{22}$ represents a group of atoms for forming a ring structure with the carbon atoms of the two carbonyl groups and the cyclopropyl group. The preferable range of the ring constituted by $L^{22}$ has the same meaning of that of $L^{21}$ and may be any of an aromatic hydrocarbon ring, an aliphatic hydrocarbon ring, an aromatic heterocyclic ring, and an aliphatic heterocyclic ring, but the ring is preferably a heterocyclic ring (aromatic heterocyclic ring and an aliphatic heterocyclic ring), and more preferably an aliphatic heterocyclic ring. There are no particular limitations on the heteroatom that constitutes the heterocyclic ring, but examples include an oxygen atom, a nitrogen atom, and a sulfur atom, and the heteroatom is preferably an oxygen atom or a nitrogen atom. The ring constituted by $L^{21}$ may have a substituent, and examples of the substituent thereof include examples of the substituent T that will be described below. Meanwhile, the aliphatic hydrocarbon ring and the aliphatic heterocyclic ring may contain an unsaturated bond.

The ring constituted by $L^{21}$ or the ring constituted by $L^{22}$ is preferably a 5- or 6-membered ring, particularly preferably a 6-membered ring. The ring constituted by $L^{21}$ or the ring constituted by $L^{22}$ is preferably a ring represented by formula (IIa) or (IIb).

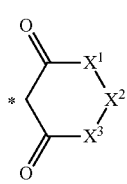

(IIa)

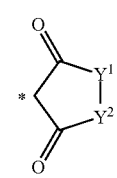

(IIb)

In formula (IIa) or (IIb), symbol * represents the position of the carbon atom with the cyclopropyl group. $X^1$ and $X^3$ each represent an oxygen atom, $CR^{25}{}_2$, or $NR^{25}$. $R^{25}$ has the same meaning as that described above. $X^2$ is $CR^{25}{}_2$, CS, or CO. $Y^1$ and $Y^2$ are an oxygen atom, $NR^{25}$, or $CR^{25}{}_2$.

Hereinafter, the specific examples of the compound represented by formula (II-1) are described, but the present embodiment is not construed by being limited thereto.

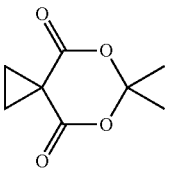

(SII-1)

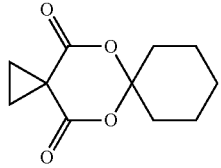

(SII-2)

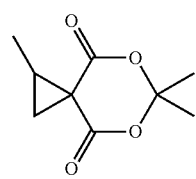

(SII-3)

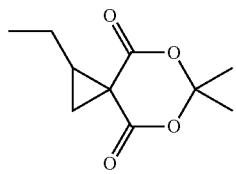

(SII-4)

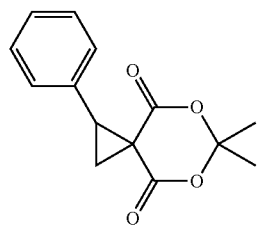

(SII-5)

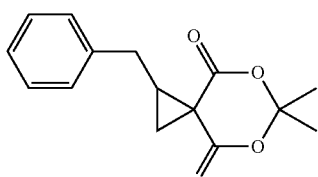

(SII-6)

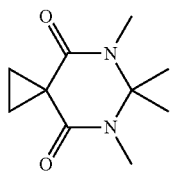

(SII-7)

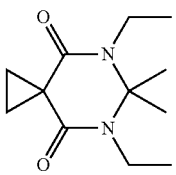

(SII-8)

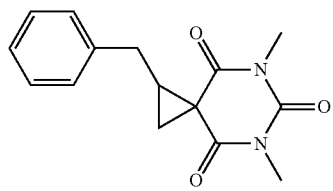

(SII-9)

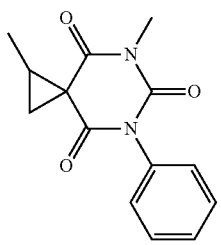

(SII-10)

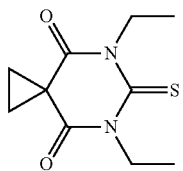

(SII-11)

-continued

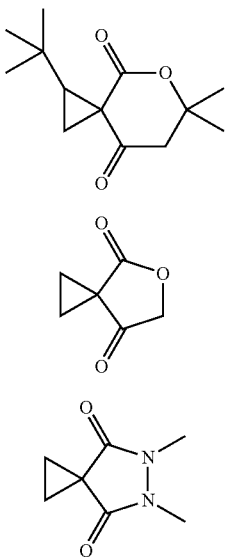

(SII-12)

(SII-13)

(SII-14)

The compound represented by formula (II-1) can be synthesized according to a conventional method, but specifically, reference can be made to the procedure of the synthetic example described below.

The content of the particular cyclopropane compound represented by formula (II-1) is not particularly limited, but the content is preferably 0.005% to 20% by mass, more preferably 0.01% by mass or more, and particularly preferably 0.05% by mass or more, relative to the total mass of the liquid electrolyte. When the content is adjusted to a value more than or equal to the lower limit, the effect of the present embodiment is sufficiently exhibited, and decomposition of the liquid electrolyte can be suppressed, which is preferable. The upper limit is more preferably 15% by mass or less, and particularly preferably 10% by mass or less. When the content is adjusted to a value less than or equal to the upper limit, excessive addition can be avoided, and the particular cyclopropane compound can be prevented from adversely affecting the battery performance, which is not preferable.

Regarding the particular cyclopropane compound represented by formula (I-1), one kind may be used alone, or any two or more kinds may be used in combination.

Embodiment III

In a non-aqueous liquid electrolyte of the present embodiment, a particular cyclopropane compound is incorporated into a liquid electrolyte. Thereby, when the non-aqueous liquid electrolyte is applied to a secondary battery, the general performance is enhanced, and the load characteristics for a positive electrode can also be enhanced. The reason for this is not clearly known, but is speculated as follows. The compound having a vinyl group of Patent Literature 1 forms a film on a negative electrode and thereby increases stability at a high temperature. However, rather the resistance caused by the film of the negative electrode increases, and this may be causative of a decrease in the load characteristics or cycle characteristics. On the contrary, it is speculated that in the present embodiment, a particular cyclopropane compound that does not have a vinyl group as described above acts favorably, and ameliorates the electrode characteristics of the negative electrode as well as the positive electrode. That is, it is contemplated that a cyclopropane ring of a particular cyclopropane compound is ring-opened, a polymer of a more desirable from for the positive electrode and the negative electrode is produced to form a SEI (Solid Electrolyte Interface), and this leads to an enhancement of the general performance for a secondary battery.

Compound Represented by Formula (III-1)

The non-aqueous liquid electrolyte for a secondary battery of the present embodiment contains a particular cyclopropane compound represented by the following formula (III-1).

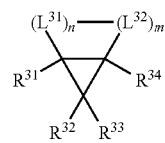

(III-1)

$R^{31}$ to $R^{34}$

In formula (III-1), $R^{31}$ to $R^{34}$ each independently represent a hydrogen atom or a substituent, among them, it is preferable that $R^{31}$ to $R^{34}$ each independently represent a hydrogen atom, an alkyl group, an aryl group, an alkoxy group, a fluorine atom, a group containing a carbonyl group, or a cyano group. Specific examples of the alkyl group, aryl group and alkoxy group include the examples of substituent T that will be described below. In addition, $R^{31}$ to $R^{34}$ may bind to each other, or fused together, to form a ring structure. Furthermore, $R^{31}$ to $R^{34}$ may further have a substituent, and examples of the substituents thereof include the examples of substituent T that will be described below.

$R^{31}$ to $R^{34}$ each independently preferably represent a hydrogen atom, an alkyl group, a fluorine atom, a group containing an carbonyl group, or a cyano group, and a hydrogen atom, an alkyl group, a group containing an carbonyl group, and a cyano group are more preferable.

Examples of the alkyl group include the examples of substituent T that will be described below, but the alkyl group is preferably an alkyl group having 1 to 10 carbon atoms, more preferably an alkyl group having 1 to 7 carbon atoms, and particularly preferably a methyl group, an ethyl group, an isopropyl group, a tertiary butyl group or a benzyl group.

The aryl group is preferably an aryl group having 6 to 26 carbon atoms, and particularly preferably a phenyl group.

The alkoxy group is preferably an alkoxy group having 1 to 20 carbon atoms, more preferably an alkoxy group having 1 to 10 carbon atoms, even more preferably an alkoxy group having 1 to 6 carbon atoms, and particularly preferably a methoxy group, an ethoxy group, an isopropoxy group, or a tertiary butoxy group.

The carbonyl group-containing group is preferably an alkylcarbonyl group, an amide group or an alkxoycarbonyl group, and particularly preferably a methylcarbonyl group, an ethylcarbonyl group, an ethoxycarbonyl group, an ethoxycarbonyl group, an isopropoxycarbonyl group, or a tertiary butoxycarbonyl group.

$L^{31}$ $L^{31}$ represents an oxygen atom, $-NR^{35}-$, or a carbonyl group. $L^{31}$ preferably represents an oxygen atom or a carbonyl group. $R^{35}$ has the same meaning as defined for $L^{32}$ that will be described below. As for $(L^{31})_n$ in the formula, the linking group constituted by $(L^{31})n$ is preferably a carbonyloxy group, an amide group, or —COR³⁶— (wherein $R^{36}$ represents an alkylene group having 1 to 3 carbon atoms). $R^{36}$ may further have a substituent, and examples of the substituent thereof include the examples of substituent T that will be described below.

$L^{32}$ $L^{32}$ represents an alkylene group (preferably an alkylene group having 1 to 4 carbon atoms), O, S, SO₂, or —NR³⁵—. $R^{35}$ represents an alkyl group (preferably an alkyl group having 1 to 5 carbon atoms) or an aryl group (preferably an aryl group having 6 to 24 carbon atoms). Specific examples of the alkyl group or aryl group as used herein include the examples of substituent T that will be described below. $R^{35}$ may further have a substituent, and examples of the substituent thereof include the examples of substituent T that will be described below. Meanwhile, the substituents carried by $L^{31}$ or $L^{32}$ may bind to each other, or fused together, to form a ring structure. When there are plural $L^{31}$'s or plural $L^{32}$'s, they may be respectively different from each other.

n and m n and m each independently represent 1 or 2. The value of n+m is preferably 3 or 4, and more preferably 3. Meanwhile, the structure constituted by -($L^{31}$)n-($L^{32}$)m- in the formula is not necessarily —CO—O—CO—. When n and m are 2, the plural structural units defined thereby may be respectively different from each other.

[Compound Represented by Formula (III-2)]

The compound represented by formula (III-1) is a compound represented by formula (III-2) or (III-3).

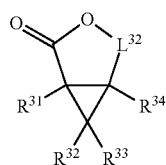
(III-2)

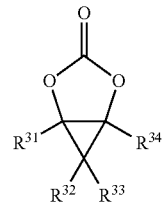
(III-3)

In formulae (III-2) and (III-3), $R^{31}$ to $R^{34}$ and $L^{32}$ have the same meanings of those of formula (III-1).

Hereinafter, the specific examples of the compound represented by formula (III-1) are described, but the present embodiment is not construed by being limited thereto.

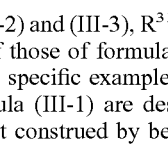
(SIII-1)

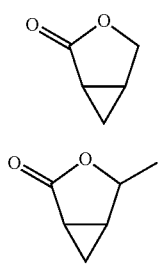
(SIII-2)

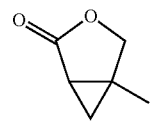
(SIII-3)

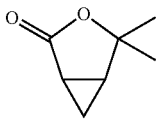
(SIII-4)

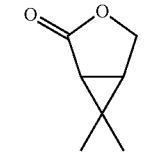
(SIII-5)

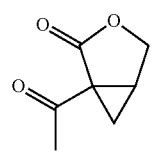
(SIII-6)

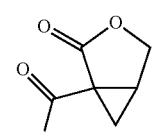
(SIII-7)

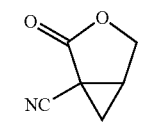
(SIII-8)

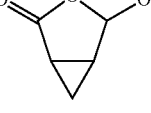
(SIII-9)

(SIII-10)

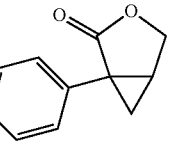
(SIII-11)

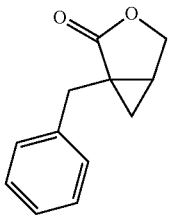
(SIII-12)

Me: methyl group
Et: ethyl group

The compound represented by formula (III-1) can be synthesized according to a conventional method, but specifically, reference can be made to the procedure of the synthetic example described below.

The content of the particular cyclopropane compound represented by formula (III-1) is not particularly limited, but the content is preferably 0.005% to 20% by mass, more preferably 0.01% by mass or more, and particularly preferably 0.05% by mass or more, relative to the total mass of the liquid electrolyte. When the content is adjusted to a value more than or equal to the lower limit, the effect of the present embodiment is sufficiently exhibited, and decomposition of the liquid electrolyte can be suppressed, which is preferable. The upper limit is more preferably 15% by mass or less, and particularly preferably 10% by mass or less. When the content is adjusted to a value less than or equal to the upper limit, excessive addition can be avoided, and the particular cyclopropane compound can be preferably prevented from adversely affecting the battery performance.

Regarding the particular cyclopropane compound represented by formula (III-1), one kind may be used alone, or any two or more kinds may be used in combination.

It is noted that in the present specification, the representation of the compound is used in the sense that not only the compound itself, but also its salt and its ion are incorporated therein. Further, it is used in the sense that the compound includes a derivative thereof which is modified in a predetermined part in the range of achieving a desired effect. Further, in the present specification, a substituent (and also a linking group) that is not specified by substitution or non-substitution means that the substituent may have an optional substituent. This is applied to the compound that is not specified by substitution or non-substitution. Preferable examples of the substituent include the substituent T described below. When plural substituents and ligands are adjacent to each other, they may be linked or condensed from each other to form a ring, even in a case where it is not specified.

Examples of the substituent T include an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group having 0 to 20 carbon atoms, e.g. amino, N,N-dimethylamino, N,N-diethylamino, N-ethylamino, or anilino), a sulfonamide group (preferably a sulfonamide group having 0 to 20 carbon atoms, e.g. N,N-dimethylsulfonamide, or N-phenylsulfonamide), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acyl amino group (preferably an acylamino group having 1 to 20 carbon atoms, e.g. acetylamino, or benzoylamino), a cyano group, and a halogen atom (e.g. a fluorine atom, a chlorine atom, a bromine atom, or an iodine atom). Among these, an alkyl group, an alkenyl group, an aryl group, a heterocyclic group, an alkoxy group, an aryloxy group, an alkoxycarbonyl group, an amino group, an acylamino group, a cyano group and a halogen atom are more preferable; and an alkyl group, an alkenyl group, a heterocyclic group, an alkoxy group, an alkoxycarbonyl group, an amino group, an acylamino group and a cyano group are particularly preferable.

When a compound, a substituent or the like contains an alkyl group, an alkenyl group or the like, these groups may be linear or branched, and may be substituted or unsubstituted. Furthermore, when the compound, substituent or the like contains an aryl group, a heterocyclic group or the like, they may be monocyclic or fused-cyclic, and may be substituted or unsubstituted.

[Organic Solvent]

The organic solvent used in the present invention is preferably a cyclic carbonate, a chain-like carbonate or a cyclic ester. Examples thereof include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, and dimethyl sulfoxide/phosphate. These may be used alone or in combination of two or more. Of these, at least one selected from the group consisting of ethylene carbonate, propylene carbonate, dimethyl carbonate, diethyl carbonate and ethyl methyl carbonate is preferred. In particular, a combination of a high-viscosity (high-dielectric constant) solvent (for example, having a relative permittivity $\in$ of 30 or more) such as ethylene carbonate or propylene carbonate with a low-viscosity solvent (for example, having a viscosity of up to 1 m·Pas) such as dimethyl carbonate, ethyl methyl carbonate or diethyl carbonate is more preferred because the dissociation ability and the ionic mobility of the electrolytic salt are improved.

In addition, the solvent may contain a cyclic carbonate ester having an unsaturated bond because the chemical stability of the liquid electrolyte is further improved. For example, at least one selected from the group consisting of a vinylene carbonate compound, a vinyl ethylene carbonate compound, and a methylene ethylene carbonate compound is used as the cyclic carbonate ester having an unsaturated bond.

Examples of the vinylene carbonate compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

Examples of the vinyl ethylene carbonate compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one.

Examples of the methylene ethylene carbonate compound include 4-methylene-1,3-dioxolan-2-one, 4,4-dimethyl-5-methylene-1,3-dioxolan-2-one and 4,4-diethyl-5-methylene-1,3-dioxolan-2-one.

These may be used alone or as a mixture of two or more thereof. Of these, vinylene carbonate is preferable because a high effect is obtained.

[Electrolyte]

Electrolyte is preferably a metal ion belong to Group I or Group II in the Periodic Table of Elements or a salt thereof and is suitably selected depending on the purpose of a liquid electrolyte. For example, lithium salts, potassium salts, sodium salts, calcium salts, and magnesium salts can be mentioned. When the liquid electrolyte is used in a secondary battery or the like, from the viewpoint of the output power of the secondary battery, a lithium salt is preferred. In a case of using the liquid electrolyte as the electrolyte of a non-aqueous liquid electrolyte for lithium secondary batteries, it is desirable to select a lithium salt as the salt of the metal ion. The lithium salt is not particularly limited as long as it is a lithium salt that is conventionally used in the electrolyte of a non-aqueous liquid electrolyte for lithium secondary batteries, but for example, the salts described below are preferred.

(L-1) Inorganic lithium salt: inorganic fluoride salt such as $LiPF_6$, $LiBF_4$, $LiAsF_6$, $LiSbF_6$; perhalogenic acid salts such as $LiClO_4$, $LiBRO_4$, $LiIO_4$; and inorganic chloride salt such as $LiAlCl_4$, and the like.

(L-2) Organic lithium salt containing fluorine: perfluoroalkanesulfonic acid salt such as $LiCF_3SO_3$; perfluoroalkanesulfonic acid salts such as $LiN(CF_3SO_2)_2$; perfluoroalkanesulfonylimide salts such as $LiN(CF_3CF_2SO_2)_2$, $LiN(FSO_2)_2$, and $LiN(CF_3SO_2)(C_4F_9SO_2)$; perfluoroalkanesulfonylmethide salts such as $LiC(CF_3SO_2)_3$; fluoroalkyl fluorophosphoric acid salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalate)borate, lithium difluoro(oxalate)borate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, $LiN(Rf^1SO_2)(Rf^2SO_2)_2$, and lithium bis(oxalate)borate salts are preferred; and lithium imide salts such as $LiPF_6$, $LiBF_4$, $LiN(Rf^1SO_2)_2$, $LiN(FSO_2)_2$ and $LiN(Rf^1SO_2)(Rf^2SO_2)_2$, and lithium bis(oxalate)borate salts are more preferred. Herein, $Rf^1$ and $Rf^2$ each represent a perfluoroalkyl group.

Meanwhile, as for the lithium salt that is used in the liquid electrolyte, one kind may be used alone, or any two or more kinds may be used in combination.

The electrolyte is added to the liquid electrolyte in such an amount that the electrolyte is contained at a preferred salt concentration to be mentioned below in the method for preparing the liquid electrolyte. The concentration thereof is selected according to the purpose of the liquid electrolyte, but the content is generally from 10 mass % to 50 mass %, and more preferably from 15 mass % to 30 mass %, relative to the total mass of the liquid electrolyte. When evaluated as the ionic concentration, the salt concentration need only be calculated in terms of the salt with an advantageously applied metal.

[Producing Method of Liquid Electrolyte]

Next, a representative method for preparing the liquid electrolyte of the present invention will be described by taking the case of using a lithium salt as the salt of a metal ion, as an example. The liquid electrolyte of the present embodiment is prepared by dissolving a lithium salt and various additives that are added as desired, in a non-aqueous liquid electrolyte solvent.

The term "non-aqueous" as used in the present invention means that water is substantially not contained, and a small amount of water may be contained as long as the effects of the present invention are not impaired. In consideration of obtaining good properties, water is preferably contained in an amount of up to 200 ppm and more preferably up to 100 ppm. Although the lower limit is not particularly restricted, it is practical for the water content to be 10 ppm or more in consideration of inevitable incorporation.

(Composition of Liquid Electrolyte)

In regard to the metal salt concentration in the liquid electrolyte thus prepared, since the viscosity of the liquid electrolyte increases as the concentration increases, there exists a concentration range adequate for exhibiting high ionic conductivity. A preferred concentration range is from 10 mass % to 50 mass %, and more preferably from 15 mass % to 30 mass %, relative to the total mass of the liquid electrolyte. Although the viscosity of the liquid electrolyte is not limited, the viscosity is preferably from 5 to 0.5 m·Pas, and more preferably from 5 to 0.1 m·Pas.

(Kit)

The liquid electrolyte of the present invention may be formed from a kit composed of plural liquids, powders or the like. For example, the liquid electrolyte may be in a form that a first agent (first liquid) is composed of an electrolyte and an organic solvent, a second agent (second liquid) is composed of the particular cyclopropane compound and an organic solvent, and the two liquids are mixed to prepare a liquid before use. The contents of the various components at this time are preferably such that the contents are in the ranges described above after the components are mixed.

[Secondary Battery]

An embodiment of the secondary battery of the present invention will be described referring to FIG. 1, a cross-sectional diagram of the secondary battery being illustrated in a substantially schematized manner. The lithium ion secondary battery 10 of the present embodiment includes the non-aqueous liquid electrolyte 5 for a secondary battery, a positive electrode C (current collector for positive electrode 1, positive electrode active material layer 2) capable of insertion and release of lithium ions, and a negative electrode A (current collector for negative electrode 3, negative electrode active material layer 4) capable of insertion and discharge, or dissolution and precipitation, of lithium ions.

In addition to these essential members, the lithium secondary battery may also be constructed to include a separator 9 that is disposed between the positive electrode and the negative electrode, current collector terminals (not shown), and an external case (not shown), in consideration of the purpose of using the battery, the form of the electric potential, and the like. According to the necessity, a protective element may also be mounted in at least any one side of the interior of the battery and the exterior of the battery. By employing such a structure, transfer of lithium ions a and b occurs in the liquid electrolyte 5, and charging and discharging $\alpha$ and $\beta$ can be carried out. Thus, operation and accumulation can be carried out by means of an operating means 6 through the circuit wiring 7. The configuration of the lithium secondary battery, which is a preferable embodiment of the present invention, will be described in detail below.

(Battery Shape)

There are no particular limitations on the battery shape that is applied to the lithium secondary battery of the present embodiment, and examples of the shape include a bottomed cylindrical shape, a bottomed rectangular shape, a thin flat shape, a sheet shape, and a paper shape. The lithium secondary battery of the present embodiment may have any of these shapes. Furthermore, an atypical shape such as a horseshoe shape or a comb shape, which is designed in consideration of the form of the system or device to which the lithium secondary battery is incorporated, may also be used. Among them, from the viewpoint of efficiently releasing the heat inside the battery to the outside, a rectangular shape such as a bottomed rectangular shape or a thin flat shape, which has at least one relatively flat and large-sized surface, is preferred.

Figure 2:
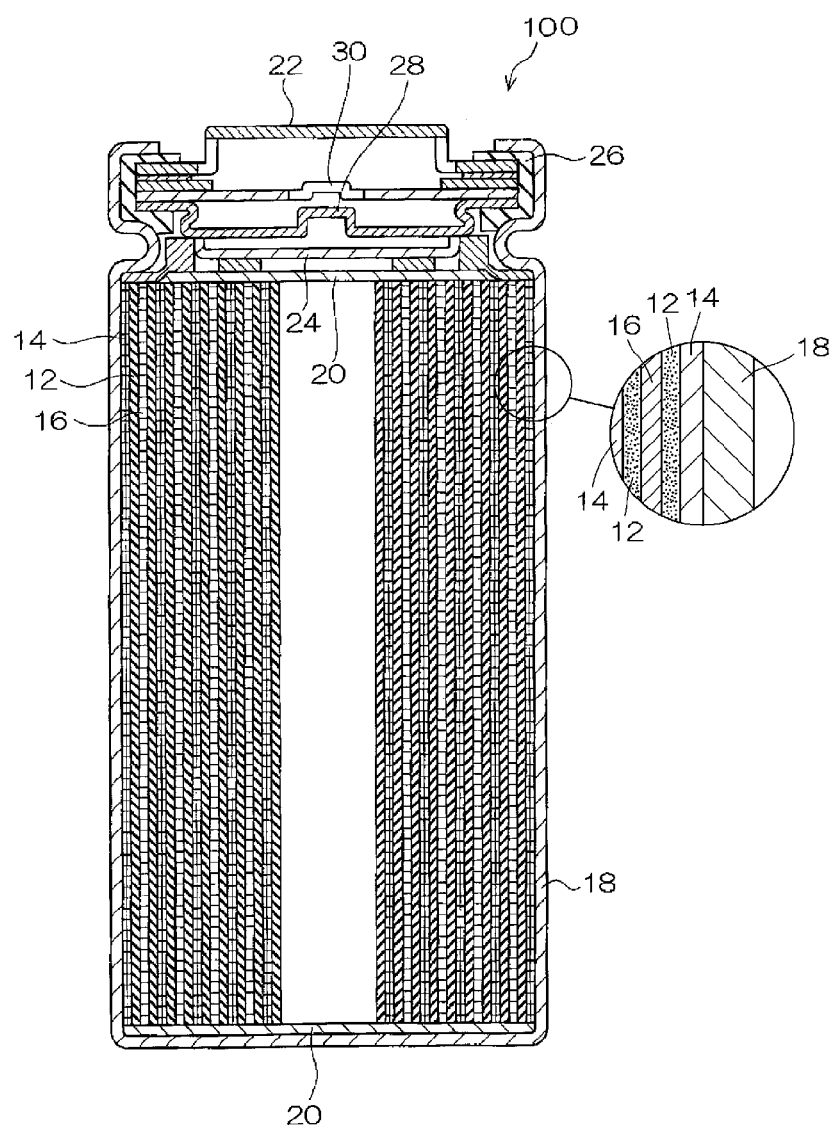
FIG. 2 is a cross-sectional diagram schematically illustrating a specific configuration of a lithium ion secondary battery according to a preferable embodiment of the present invention.

In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18. In addition, reference numeral 20 in the diagram represents an insulating plate, 22 represents an opening sealing plate, 24 represents a positive electrode current collector, 26 represents a gasket, 28 represents a pressure-sensitive valve body, and 30 represents a current blocking element. Meanwhile, the diagram inside the magnified circle is indicated with varying hatchings in consideration of visibility, but the various members are equivalent to the overall diagram by the reference numerals.

(Battery-Constituting Members)

Next, the various members of the lithium secondary battery of the present embodiment will be described below. The lithium secondary battery of the present invention includes at least the non-aqueous liquid electrolyte for batteries of the present invention as the liquid electrolyte.

(Liquid Electrolyte)

The liquid electrolyte used in the lithium secondary battery of the present embodiment preferably contains an organic solvent, the particular cyclopropane compound described above, and an electrolyte salt (liquid electrolyte 5

(FIG. 1)). The electrolyte salt used in the non-aqueous liquid electrolyte for a secondary battery is the salt of an ion of a metal which belongs to Group 1 or Group 2 of the Periodic Table of Elements as described above, and the salts described in detail in the exemplary embodiment of the non-aqueous liquid electrolyte for a secondary battery can be used. Furthermore, regarding the organic solvent (non-aqueous liquid electrolyte solvent) used in the lithium secondary battery, those described in detail in the embodiment of the non-aqueous liquid electrolyte for a secondary battery can be similarly used. Also, other additives may be added to further enhance the performance.

In the liquid electrolyte, various additives can be used in accordance with the purpose in order to enhance the performance of the battery, to the extent that the effect of the present invention is not impaired. As for such additives, functional additives such as an overcharge preventing agent, a negative electrode film forming agent, and a positive electrode protective agent may be used.

Furthermore, a combined use of a negative electrode film forming agent and a positive protective agent, or a combined use of an overcharge preventing agent, a negative electrode film forming agent, and a positive electrode protective agent is particularly preferred.

There are no particular limitations on the contents of the functional additives in the non-aqueous liquid electrolyte, but the contents are respectively preferably 0.01% by mass or greater, particularly preferably 0.1 mass % or greater, and more preferably 0.2 mass % or greater relative to the total amount of the non-aqueous liquid electrolyte. The upper limit is preferably 5 mass % or less, particularly preferably 3 mass % or less, and more preferably 2 mass % or less. By adding these compounds, bursting and ignition of the battery at the time of abnormality due to overcharging can be suppressed, or the capacity retention characteristics or cycle characteristics after high temperature storage can be enhanced.

(Electrode Mixtures)

An electrode mixture is a composite obtained by applying an active substance, and a dispersion of an electroconductive agent, a binder, a filler and the like on a current collector (electrode base material). For a lithium battery, a positive electrode mixture in which the active substance is a positive electrode active substance, and a negative electrode mixture in which the active substance is a negative electrode active substance are preferably used. Next, a positive electrode active substance, a negative electrode active substance, an electroconductive agent, a binder, a filler, and a current collector, which constitute the electrode mixture, will be described.

(Positive Electrode Active Substance)

As the positive electrode active substance, a transition metal oxide which is capable of reversible insertion and release of lithium ions can be used, but it is preferable to use a lithium-containing transition metal oxide. Suitable examples of a lithium-containing transition metal oxide that is preferably used as a positive active substance, include oxides containing one or more of lithium-containing Ti, lithium-containing V, lithium-containing Cr, lithium-containing Mn, lithium-containing Fe, lithium-containing Co, lithium-containing Ni, lithium-containing Cu, lithium-containing Mo, and lithium-containing W. Furthermore, alkali metals other than lithium (elements of Group 1 (Ia) and Group 2 (IIa) of the Periodic Table of Elements), and/or Al, Ga, In, Ge, Sn, Pb, Sb, Bi, Si, P, B and the like may also be incorporated. The amount of incorporation is preferably from 0 mol % to 30 mol % relative to the amount of the transition metal.

Among the lithium-containing transition metal oxides that are preferably used as the positive electrode active substance, a substance synthesized by mixing a lithium compound and a transition metal compound (herein, the transition metal refers to at least one selected from Ti, V, Cr, Mn, Fe, Co, Ni, Mo, and W) such that the total molar ratio of lithium compound/transition metal compound is 0.3 to 2.2.

Furthermore, among the lithium compound/transition metal compound, materials containing $Li_gM3O_2$ (wherein M3 represents one or more elements selected from Co, Ni, Fe, and Mn; and g represents 0 to 1.2), or materials having a spinel structure represented by $Li_hM4_2O$ (wherein M4 represents Mn; and h represents 0 to 2) are particularly preferred. As M3 and M4 described above, Al, Ga, In, Ge, Sn, Pb, Sb, Bi, Si, P, B, or the like may also be incorporated in addition to the transition metal. The amount of incorporation is preferably from 0 mol % to 30 mol % relative to the amount of the transition metal.

Among the materials containing $Li_gM3O_2$ and the materials having a spinel structure represented by $Li_hM4_2O$, $Li_gCoO_2$, $Li_gNiO_2$, $Li_gMnO_2$, $Li_gCo_jNi_{1-j}O_2$, $Li_hMn_2O_4$, $LiNi_jMn_{1-j}O_2$, $LiCo_jNi_hAl_{1-j-h}O_2$, $LiCo_jNi_hMn_{1-j-h}O_2$, $LiMn_hAl_{2-h}O_4$, and $LiMn_jNi_{2-h}O_4$ (wherein in the respective formulas, g represents 0.02 to 1.2; j represents 0.1 to 0.9; and h represents 0 to 2) are particularly preferred; and $Li_gCoO_2$, $LiMn_2O_4$, $LiNi_{0.85}Co_{0.01}Al_{0.05}O_2$, and $LiNi_{0.33}Co_{0.33}Mn_{0.33}O_2$ are most preferred. From the viewpoints of high capacity and high power output, among those described above, an electrode containing Ni is more preferred. Herein, the g value and the h value are values prior to the initiation of charging and discharging, and are values that increase or decrease as charging or discharging occurs. Specific examples thereof include $LiNi_{0.5}Mn_{0.5}O_2$, $LiNi_{0.85}Co_{0.01}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphate compound include V, Ti, Cr, Mn, Fe, Co, Ni, and Cu, and specific examples of the compound include iron phosphates such as $LiFePO_4$, $Li_3Fe_2(PO_4)_3$, and $LiFeP_2O_7$; cobalt phosphates such as $LiCoPO_4$; and compounds in which a portion of the transition metal atoms that constitute the main component of these lithium-transition metal phosphate compounds has been substituted by another metal such as Al, Ti, V, Cr, Mn, Fe, Co, Li, Ni, Cu, Zn, Mg, Ga, Zr, Nb, or Si.

Furthermore, a solid solution-based positive electrode material exhibiting a high electric potential close to 5 V and a very high specific capacity that exceeds 250 mAh/g (for example, $Li_2MnO_3$—$LiMO_2$ (wherein M represents a metal such as Ni, Co, or Mn) is attracting increasing attention as a positive electrode material for the next-generation lithium ion batteries. The liquid electrolyte of the present invention is also preferably a combination of these solid solution-based positive electrode materials.

The average particle size of the positive electrode active substance used in the non-aqueous electrolyte secondary battery is not particularly limited, but the average particle size is preferably from 0.1 μm to 50 μm. The specific surface area is not particularly limited, but specific surface area as measured by the BET method is preferably from 0.01 $m^2$/g to 50 $m^2$/g. Furthermore, the pH of the supernatant obtainable when 5 g of the positive electrode active substance is dissolved in 100 mL of distilled water is preferably from 7 to 12.

In order to adjust the positive electrode active substance to a predetermined particle size, a well-known pulverizer or classifier may be used. For example, a mortar, a ball mill, a vibrating ball mill, a vibrating mill, a satellite ball mill, a planetary ball mill, a swirling air flow jet mill, or a sieve is used. The positive electrode active substance obtained according to the calcination method may be used after washing the substance with water, an acidic aqueous solution, an alkaline aqueous solution, or an organic solvent.

(Negative Electrode Active Substance)

There are no particular limitations on the negative electrode active substance, as long as the negative electrode active substance is capable of reversible insertion and release of lithium ions, and examples thereof include carbonaceous materials, metal oxides such as tin oxide and silicon oxide, metal composite oxides, simple lithium substance or lithium alloys such as a lithium-aluminum alloy, and metals capable of forming an alloy with lithium, such as Sn and Si. For these materials, one kind may be used alone, or two or more kinds may be used in any combination at any proportions. Among them, carbonaceous materials or lithium composite oxides are preferably used from the viewpoint of safety.

Furthermore, the metal composite oxides are not particularly limited as long as the materials are capable of adsorption and release of lithium, but it is preferable for the composite oxides to contain silicon, titanium and/or lithium (e.g. lithium titanate) as constituent components, from the viewpoint of high current density charging-discharging characteristics.

A carbonaceous material that is used as a negative electrode active substance is a material which is substantially composed of carbon. Examples thereof include petroleum pitch, natural graphite, artificial graphite such as vapor-grown graphite, and carbonaceous materials obtained by firing various synthetic resins such as PAN-based resins and furfuryl alcohol resins. Further, the examples include various carbon fibers such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres, graphite whiskers, and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites described in JP-A-62-22066, JP-A-2-6856, and JP-A-3-45473. The carbonaceous materials are not necessarily single materials, and a mixture of natural graphite and an artificial graphite as described in JP-A-5-90844, a graphite having a coating layer as described in JP-A-6-4516, and the like can also be used.

In regard to the metal oxides and metal composite oxides that are negative electrode active substances used in the lithium secondary battery, at least one of these may be included. The metal oxides and metal composite oxides are particularly preferably amorphous oxides, and furthermore, chalcogenides which are reaction products of metal elements and the elements of Group 16 of the Periodic Table of Elements are also preferably used. The term amorphous as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range of from 40° to 70° is preferably 100 times or less, and more preferably 5 times or less, than the diffraction line intensity of the apex of the broad scattering band exhibited at a 2θ value in the range of from 20° to 40°, and it is particularly preferable that the substance does not have any crystalline diffraction line.

Among the group of compounds consisting of the amorphous oxides and chalcogenides, amorphous oxides and chalcogenides of semi-metallic elements are more preferred, and oxides and chalcogenides formed from one kind alone or combinations of two or more kinds of the elements of Group 13 (IIIB) to Group 15 (VB) of the Periodic Table of Elements, Al, Ga, Si, Sn, Ge, Pb, Sb and Bi are particularly preferred. Specific preferred examples of the amorphous oxides and chalcogenides include, for example, $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$ as for metal compounds. Furthermore, these may also be composite oxides with lithium oxide, for example, $Li_2SnO_2$.

The average particle size of the negative electrode active substance used in the non-aqueous electrolyte secondary battery is preferably from 0.1 μm to 60 μm. In order to adjust the negative electrode active substance to a predetermined particle size, a well-known pulverizer or classifier may be used. For example, a mortar, a ball mill, a sand mill, a vibrating ball mill, a satellite ball mill, a planetary ball mill, a swirling air flow jet mill, and a sieve are suitably used. At the time of pulverization, wet pulverization of using water or an organic solvent such as methanol to co-exist with the negative electrode active substance can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, as a convenient method.

Suitable examples of the negative electrode active substance that can be used together with the amorphous oxide negative electrode active substances represented by Sn, Si and Ge, include carbon materials that are capable of adsorption and release of lithium ions or lithium metal, as well as lithium, lithium alloys, and metal capable of alloying with lithium.

In the present invention, it is preferable to use lithium titanate, more specifically lithium titanium oxide ($Li[Li_{1/3}Ti_{5/3}]O_4$), as an active material of the negative electrode. When this is used as a negative electrode active material, the effect of forming an SEI by the particular cyclopropane compound is further enhanced, and superior battery performance can be exhibited.

According to a preferred embodiment, the liquid electrolyte of the present invention exhibits excellent characteristics when the liquid electrolyte is either combined with a high potential negative electrode (preferably a lithium titanium oxide, potential: 1.55 V), or combined with a low potential negative electrode (preferably a carbon material, potential: 0.1 V). The liquid electrolyte of the present invention can also be preferably used in batteries using a negative electrode of a metal or metal oxide capable of forming an alloy with lithium (preferably Si, Si oxide, Si/silicon oxide, Sn, Sn oxide, $SnB_xP_yO_z$, Cu/Sn, and plural composites among these), for which development directed to capacity increase is underway, and negative electrodes of composites of these metals or metal oxides and carbon materials.

(Electroconductive Material)

As for the electroconductive material, any material may be used as long as it is an electron conductive material which does not cause a chemical change in a constructed secondary battery, and any known electroconductive material can be used. Usually, electroconductive materials such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP-A-63-10148, 554), and the like), metal fibers, and polyphenylene derivatives (described in JP-A-59-20,971) can be incorporated alone or as mixtures thereof. Among them, a combination of graphite and acetylene black is particularly preferred. The amount of addition of the electroconductive agent is preferably from 1 mass % to 50 mass %, and more preferably from 2 mass % to 30 mass %. In the case of carbon or graphite, the amount of addition is particularly preferably from 2 mass % to 15 mass %.

(Binder)

Preferred examples of the binder include polysaccharides, thermoplastic resins, and polymers having rubber elasticity, and among them, preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers such as poly(acrylic acid), poly(sodium acrylate), polyvinylphenol, poly(vinyl methyl ether), poly(vinyl alcohol), polyvinylpyrrolidone, polyacrylonitrile, polyacrylamide, poly(hydroxy(meth)acrylate), and a styrene-maleic acid copolymer; poly(vinyl chloride), polytetrafluoroethylene, poly(vinylidene fluoride), a tetratluoroethylene-hexafluoropropylene copolymer, a vinylidene fluoride-tetratluoroethylene-hexafluoropropylene copolymer, polyethylene, polypropylene, an ethylene-propylene-diene terpolymer (EPDM), a sulfonated EPDM, a poly(vinyl acetal) resin, (meth)acrylic acid ester copolymers containing (meth)acrylic acid esters such as methyl methacrylate and 2-ethylhexyl acrylate, a (meth)acrylic acid ester-acrylonitrile copolymer, a poly(vinyl ester) copolymer containing a vinyl ester such as vinyl acetate, a styrene-butadiene copolymer, an acrylonitrile-butadiene copolymer, polybutadiene, a neoprene rubber, a fluorine rubber, poly(ethylene oxide), a polyester polyurethane resin, a polyether polyurethane resin, a polycarbonate polyurethane resin, a polyester resin, a phenolic resin, and an epoxy resin. More preferred examples include a poly(acrylic acid ester)-based latex, carboxymethyl cellulose, polytetrafluoroethylene, and poly(vinylidene fluoride).

As for the binder, one kind may be used alone, or two or more kinds may be used as mixtures. If the amount of addition of the binder is small, the retention power and the aggregating power of the electrode mixture are weakened. If the amount of addition is too large, the electrode volume increases, and the capacity per unit volume or unit mass of the electrode is decreased. For such reasons, the amount of addition of the binder is preferably from 1 mass % to 30 mass %, and more preferably from 2 mass % to 10 mass %.

(Filler)

Regarding the material that forms the filler, any fibrous material that does not cause a chemical change in the secondary battery can be used. Usually, fibrous fillers formed from olefinic polymers such as polypropylene and polyethylene, and materials such as glass and carbon are used. The amount of addition of the filler is not particularly limited, but the amount of addition is preferably from 0 mass % to 30 mass %.

(Current Collector)

As the current collector for the positive and negative electrodes, an electron conductor that does not cause a chemical change in the non-aqueous electrolyte secondary battery is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include copper, stainless steel, nickel, and titanium, and more preferred examples include copper and copper alloys.

Regarding the shape of the current collector, a film sheet-shaped current collector is usually used, but a net-shaped material, a film sheet formed by punching, a lath material, a porous material, a foam, a material obtained by molding a group of fibers, and the like can also be used. The thickness of the current collector is not particularly limited, but the thickness is preferably from 1 μm to 500 μm. Furthermore, it is also preferable to provide surface unevenness on the surface of the current collector through a surface treatment.

Electrode mixtures for lithium secondary batteries are formed by members appropriately selected from these materials.

(Separator)

The separator used in the lithium secondary battery is not particularly limited as long as the separator is formed of a material which electronically insulates the positive electrode and the negative electrode, and has mechanical strength, ion permeability, and oxidation-reduction resistance at the surfaces in contact with the positive electrode and the negative electrode. Examples of such a material that may be used include porous polymer materials or inorganic materials, organic-inorganic hybrid materials, and glass fibers. These separators preferably have a shutdown function for securing safety, that is, a function of increasing resistance by blocking the voids at 80° C. or more, and thereby cutting off the electric current, and the blocking temperature is preferably from 90° C. to 180° C. From the viewpoint of the strength of the separator, it is particularly preferable to use a separator reinforced with an inorganic material or glass fiber.

The shape of the pores of the separator is usually circular or elliptical, and the size is from 0.05 μm to 30 μm, and preferably from 0.1 μm to 20 μm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material such as polyethylene or polypropylene may be used, or a compositized material of two or more kinds may also be used. A laminate of two or more kinds of finely porous films that are different in the pore size, pore ratio, pore blocking temperature and the like, is preferred.

As the inorganic material, oxides such as alumina and silicon dioxide, nitrides such as aluminum nitride and silicon nitride, and sulfates such as barium sulfate and calcium sulfate are used, and a particle-shaped or fiber-shaped material is used. Regarding the form, a thin film-shaped material such as a non-woven fabric, a woven fabric, or a finely porous film is used. In the case of a thin film-shaped material, a material having a pore size of from 0.01 μm to 1 μm and a thickness of from 5 μm to 50 μm is favorably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 μm are formed on both surfaces of the positive electrode as porous layers by using a binder of a fluororesin, may be used.

[Use of Lithium Secondary Battery]

Lithium secondary batteries are applied to various applications since secondary batteries having satisfactory cycle characteristics can be produced.

There are no particular limitations on the application embodiment for the lithium secondary battery, but in the case of mounting the lithium secondary battery in electronic equipment, examples of the equipment include notebook computers, pen-input computers, mobile computers, electronic book players, mobile telephones, cordless phone handsets, pagers, handy terminals, portable facsimiles, portable copying machines, portable printers, headphone stereo sets, video movie cameras, liquid crystal television sets, handy cleaners, portable CDs, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game players, load conditioners, timepieces, strobes, cameras, and medical devices (pacemakers, hearing aids, shoulder massaging machines, and the like). Furthermore, the lithium secondary battery can be used as various batteries for munition and space batteries. Also, the lithium secondary battery can be combined with a solar cell.

The metal ion that may be used for charge transport in the secondary battery is not particularly limited and it is preferable to use the ion of a metal belonging to Group 1 or 2 of the periodic table. Among them, ions such as lithium ion, sodium ion, magnesium ion, calcium ion and aluminum ion are preferably used. As for the general technical matters of secondary batteries using lithium ions, a lot of literatures and books including the references mentioned at the beginning of the specification are published and referenced therefor. In addition, Journal of Electrochemical Society; Electrochemical Science and Technology (US, 1980, Vol. 127, pp. 2097-2099) and the like can be referenced for the secondary battery using sodium ions. Nature 407, pp. 724-727 (2000) and the like can be referenced for magnesium ion. J. Electrochem. Soc., Vol. 138, 3536 (1991) and the like can be referenced for calcium ion. The present invention is preferably applied to lithium ion secondary batteries because they are widely spread but the present invention also has a desired effect on other articles than the lithium ion secondary batteries and should not be construed as being limited thereto.

EXAMPLES

Hereinafter, the present invention will be described in more detail with reference to examples, but the present invention is not limited to these examples.

Example I

1. Synthesis of Cyclopropane Compound

Synthetic Example I-1

Cyclopropane (SI-1)

To a solution of 2.22 g of 1-cyano-1-cyclopropanecarboxylic acid, 84 ml of methylene chloride and 12 ml of methanol, 12 ml of a 2 M diethyl ether solution of trimethylsilyldiazomethane was added dropwise. After completion of foaming, 1 ml of acetic acid was added thereto. The mixture was subjected to extraction with methylene chloride, washing with a saturated aqueous solution of sodium hydrogen carbonate, subsequent drying over sodium sulfate, and concentration. An organic substance thus obtained was purified by distillation, and thus 1.9 g of a cyclopropane compound (SI-1) was obtained.

Synthetic Example I-2

Cyclopropane (SI-2)

5.31 g of glycerol carbonate, 9.28 g of dicyclohexylcarbodiimide, and 55 mg of 4-dimethylaminopyridine were dissolved in 60 ml of methylene chloride. A solution prepared by dissolving 5 g of 1-cyano-1-cyclopropanecarboxylic acid in 50 ml of methylene chloride was added dropwise thereto at 0° C., and the mixture was allowed to react for 3 hours at room temperature. Solids were removed by celite filtration, and then the filtrate was subjected to extraction with methylene chloride, washing with saturated brine, drying over sodium sulfate, and concentration. An organic material thus obtained was purified by silica gel chromatography, and thus 6.5 g of a cyclopropane compound (SI-2) was obtained.

Synthetic Example I-3

Cyclopropane (SI-5)

Cyclopropane (SI-5) was obtained in the same manner as the synthetic example I-2 by using methoxyethoxyethanol as a raw material.

Synthetic Example I-4

Cyclopropane (SI-8)

7.6 g of $NaBH_4$ was added to 50 ml of ethanol, and a solution of 23.1 g of methyl 4-bromo-2-cyano-4-methyl-2-pentenate in 10 ml of ethanol was added dropwise thereto at room temperature. The mixture was allowed to react for 4 hours, and then 100 ml of distilled water was added thereto. The mixture was subjected to extraction with methylene chloride and concentration, and then was purified by distillation under reduced pressure. Thus, 7.2 g of a cyclopropane compound (SI-8) was obtained.

Synthetic Example I-5

Cyclopropane (SI-11)

20 ml of dehydrated THF was added to 6 ml of a 2 M THF solution of LDA, and the mixture was cooled to −78° C. 1.5 ml of cyclopropanecarboxylic acid tertiary butyl ester was added dropwise thereto, and the mixture was stirred for 3 hours while maintained at −78° C. 2.9 ml of 1-bromo-2-(2-methoxyethoxy)ethane was added thereto, the mixture was allowed to react for 2 hours at −78° C., and then the reaction mixture was stirred for one hour at room temperature. A saturated aqueous solution of ammonium chloride was added dropwise thereto, and the mixture was subjected to extraction with ethyl acetate, washing with saturated brine, and subsequent drying and concentration. An organic material thus obtained was purified by distillation, and thus 0.82 g of a cyclopropane compound (SI-11) was obtained.

Synthetic Example I-6

Cyclopropane (SI-12)

The cyclopropane compound (SI-11) was dissolved in 25 ml of methylene chloride, and 25 ml of trifluoroacetic acid and 0.5 ml of triethylhydrosilane were added thereto at 0° C. The mixture was allowed to react for 4 hours at room temperature. A 1 M aqueous solution of sodium hydroxide was added thereto to make the mixture alkaline and the mixture was subjected to extraction with ethyl acetate and washing with saturated brine. Thereafter, 1 M aqueous solution of hydrochloric acid was added thereto to make the mixture acidic, and the mixture was subjected to extraction with ethyl acetate and washing with saturated brine. Thereafter, the organic layer was dried and concentrated. A cyclopropanecarboxylic acid derivative thus obtained was subjected to esterification in the same manner as in the synthetic example I-1, and thus a cyclopropane compound (SI-12) was obtained.

Synthetic Example I-7

Cyclopropane (SI-13)

Cyclopropane (SI-13) was obtained in the same manner as the synthetic example I-5 by using 1-cyano-1-cyclopropanecarboxylic acid as a raw material.

Synthetic Example I-8

Cyclopropane (SI-14)

Cyclopropane (SI-14) was obtained in the same manner as the synthetic example I-5 by using benzyl bromide as a raw material.

Synthetic Example I-9

Cyclopropane (SI-15)

Cyclopropane (SI-15) was obtained in the same manner as the synthetic example I-6 by using the cyclopropane (SI-14) as a raw material.

Examples

2. Preparation of Liquid Electrolyte

To a liquid electrolyte of 1 Methylene carbonate (EC) of LiPF$_6$/ethyl methyl carbonate (EMC) at a volume ratio of 1:2, and a liquid electrolyte at a volume ratio of 1:3, the cyclopropane compound (SI-1) obtained in the synthetic example I-1 was added at a proportion of 0.05% by mass, and thus liquid electrolyte of Test No. I-101 was prepared.

Liquid electrolytes were similarly prepared by changing the kinds and the amounts of addition of the cyclopropane compounds used as indicated in the table (Test Nos. I-102 to I-113).

Comparative Examples

A 1 M liquid electrolyte of ethylene carbonate of LiPF$_6$/ethyl methyl carbonate was used as a comparative example.

At this time, liquid electrolytes added with vinylene carbonate (VC), the following (RI-1), the following (RI-2), and the following (RI-3) in the addition amounts as indicated in the Table were used as comparative examples.

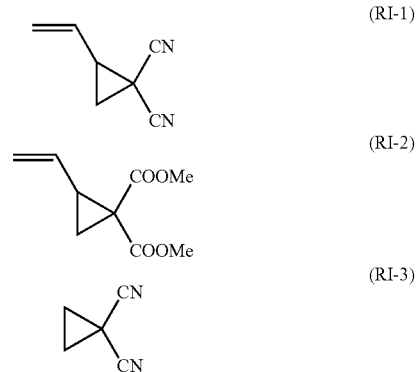

[Lithium Secondary Battery]

Lithium secondary batteries for evaluation which used the liquid electrolytes indicated in the following Table 1-1 were produced by using a lithium cobaltate mixture sheet (electrode capacity: 1.5 mAh/cm$^2$; aluminum foil base, 13 mmϕ) for the positive electrode, a natural spherical graphite electrode sheet (electrode capacity: 1.6 mAh/cm$^2$; Cu foil base, 14.5 mmϕ) for the negative electrode, and a porous film made of PP (thickness: 25 μm, 16 mmϕ) for the separator.

<Evaluation of Cycle Characteristic (Discharge Capacity Maintaining Ratio)>

A 2032-type battery produced by the method described above was used, and in a constant temperature chamber at 30° C., the battery was subjected to constant current charging at 0.7 C until the battery voltage reached 4.2 V, subsequently to charging at a constant voltage of 4.2 V until the current value reached 0.06 mA or for 2 hours, and then to constant current discharging at 0.5 C until the battery voltage reached 2.75 V. This was defined as one cycle. This procedure was repeated up to 300 cycles.

<Evaluation of Low Temperature Discharging Rate (Low Temperature Discharging Rate)>

The discharge capacity rate at −20° C. against 30° C. was measured using a 2032-type battery produced by the method described above. In a constant temperature chamber at 30° C., the battery was subjected to constant current charging at 0.1 C until the 0 battery voltage reached 4.2 V, to charging at a constant voltage of 4.2 V until the current value reached 0.06 mA or for 2 hours, and then to constant current discharging at 0.1 C in a constant temperature chamber at −20° C. until the battery voltage reached 2.75 V. Thus, the discharge capacity was measured.

<Evaluation of Self-Discharging Characteristic (Remaining Capacity Ratio)>

A 2032-type battery produced by the method described above was used, and under an environment at 30° C., the battery was subjected to constant current charging at 0.1 C at 0.4 mA until the battery voltage reached 4.2 V, subsequently charging at a constant voltage of 4.2 V until the current value reached 0.06 mA or for 2 hours, and constant current discharging at 0.1 C until the battery voltage reached 2.75 V. Thus, the initial discharge capacity was measured. Furthermore, the battery was subjected to constant current charging at 0.1 C until the battery voltage reached 4.2 V, and subsequently to charging at a constant voltage of 4.2 V until the current value reached 0.06 mA or for 2 hours, and then the battery was left to stand for 14 days under an environment at 45° C. Thereafter, the battery was taken out into an environment at 30° C., and then the discharge capacity at the time of performing discharge under the same discharging conditions was measured.

<Evaluation of Cycle Characteristic in $Li_4Ti_5O_{12}$ Negative Electrode (Discharge Capacity Maintaining Ratio)>

A 2032-type battery produced by changing the negative electrode to a lithium titanate mix sheet (electrode capacity: 1.6 mAh/cm$^2$; aluminum foil base, 14.5 mmφ) was used, and in a constant temperature chamber at 30° C., the battery was subjected to constant current charging at 0.7 C until the battery voltage reached 2.8 V, to charging at a constant voltage of 2.8 V until the current value reached 0.06 mA or for 2 hours, and then to constant current discharging at 0.5 C until the battery voltage reached 1.8 V. This was defined as one cycle. This procedure was repeated up to 500 cycles.

<Test Results>

1. Discharge Capacity Maintaining Ratio on 300th Cycle ($DCMR_{300}$: Discharge Capacity Maintaining Ratio)

TABLE 1-1

| | | Solvent | Sample compound | | |
|---|---|---|---|---|---|
| # | Electrolyte salt | Kind | Kind | mass % | $DCMR_{300}$[note 1] |
| I-101 | LiPF$_6$ | EC + EMC | SI-1 | 0.05 | 85 |
| I-102 | 1 mol/L | v/v = ½ | SI-1 | 0.5 | 84 |
| I-103 | | | SI-1 | 1 | 88 |
| I-104 | | | SI-1 | 4 | 89 |
| I-105 | | | SI-1 | 10 | 82 |
| I-106 | | | SI-2 | 4 | 85 |
| I-107 | | | SI-5 | 4 | 84 |
| I-108 | | | SI-8 | 4 | 83 |
| I-109 | | | SI-11 | 4 | 86 |
| I-110 | | | SI-12 | 4 | 83 |
| I-111 | | | SI-13 | 4 | 81 |
| I-112 | | | SI-14 | 4 | 82 |
| I-113 | | | SI-15 | 4 | 84 |
| I-114 | | | SI-16 | 1 | 83 |
| I-c11 | LiPF$_6$ | EC + EMC | — | — | <20 |
| I-c12 | 1 mol/L | v/v = ½ | VC | 1 | 69 |
| I-c13 | | | VC | 3 | 67 |
| I-c14 | | | RI-1 | 1 | <20 |
| I-c15 | | | RI-2 | 1 | <20 |
| I-c16 | | | RI-3 | 1 | <20 |

[note 1] Discharge capacity maintaining ratio (%) = (Discharge capacity maintaining ratio on 300th cycle/Discharge capacity maintaining ratio on 1st cycle) × 100

As shown in Table 1-1, it was confirmed that the capacity maintaining ratio of the 300th cycle was superior in the 2032-type non-aqueous liquid electrolyte secondary batteries of the examples (Test Nos. I-101 to I-114) to in the 2032-type non-aqueous liquid electrolyte secondary batteries of the comparative examples (Test Nos. I-c11 to I-c16). It is speculated that these results were obtained because in the negative electrodes related to the batteries of the examples, the cyclopropane compound added to the liquid electrolyte received electrons from the negative electrode and was ring-opening polymerized to form a film having a satisfactory SEI (Solid Electrolyte Interface) on the surface of the negative electrode, and thereby decomposition of the liquid electrolyte was suppressed.

Furthermore, even when $LiMn_2O_4$, $LiNi_{0.85}Co_{0.01}Al_{0.05}O_2$, and $LiNi_{0.33}Co_{0.33}Mn_{0.33}O_2$ were used for the positive electrode active material, similarly satisfactory discharge capacity maintaining ratios were exhibited.

2. LTDR: Low Temperature Discharging Rate

TABLE 1-2

| | | Solvent | Sample compound | | |
|---|---|---|---|---|---|
| # | Electrolyte salt | Kind | Kind | mass % | $LTDR$[note 2] |
| I-201 | LiPF$_6$ | EC + EMC | SI-1 | 1 | 82 |
| I-202 | 1 mol/L | v/v = ⅓ | SI-1 | 4 | 82 |
| I-203 | | | SI-2 | 4 | 80 |
| I-204 | | | SI-5 | 4 | 79 |
| I-205 | | | SI-12 | 4 | 81 |
| I-206 | | | SI-13 | 4 | 78 |
| I-207 | | | SI-15 | 4 | 80 |
| I-208 | | | SI-16 | 1 | 79 |
| I-c21 | LiPF$_6$ | EC + EMC | — | — | 55 |
| I-c22 | 1 mol/L | v/v = ⅓ | VC | 1 | 58 |
| I-c23 | | | RI-1 | 1 | 41 |
| I-c24 | | | RI-3 | 1 | 53 |

[note 2] Low temperature discharging rate (%) = (Discharge capacity at −20° C./Discharge capacity at −30° C.) × 100

As shown in Table 1-2, it was confirmed that the low temperature discharging rate was superior in the 2032-type non-aqueous liquid electrolyte secondary batteries of the examples (Test Nos. I-201 to I-208) to in the 2032-type non-aqueous liquid electrolyte secondary batteries of the comparative examples (Test Nos. I-c21 to I-c24). It is speculated that these results were obtained because in the SEI films formed on the negative electrode surface related to the batteries of the examples, lithium ions were stabilized, causing an increase in the lithium ion conductivity in the film (SEI), and the resistance to boundary surface movement was decreased.

3. RCR: Remaining Capacity Ratio

TABLE 1-3

| | | Solvent | Sample compound | | |
|---|---|---|---|---|---|
| # | Electrolyte salt | Kind | Kind | mass % | $RCR$[note 3] |
| I-301 | LiPF$_6$ | EC + EMC | SI-1 | 1 | 94 |
| I-302 | 1 mol/L | v/v = ½ | SI-1 | 4 | 95 |
| I-303 | | | SI-2 | 4 | 92 |
| I-304 | | | SI-5 | 4 | 90 |
| I-305 | | | SI-12 | 4 | 92 |
| I-306 | | | SI-13 | 4 | 87 |
| I-307 | | | SI-15 | 4 | 88 |
| I-308 | | | SI-16 | 1 | 89 |
| I-C31 | LiPF$_6$ | EC + EMC | — | — | 76 |
| I-C32 | 1 mol/L | v/v = ½ | VC | 1 | 79 |
| I-C33 | | | RI-1 | 1 | 76 |
| I-C34 | | | RI-3 | 1 | 62 |

[note 3] Remaining capacity ratio (%) = (Discharge capacity after being left in 14 days/Discharge capacity at the initial period) × 100

As shown in Table 1-3, it was confirmed that the self-discharge characteristics were superior in the 2032-type non-aqueous liquid electrolyte secondary batteries of the examples (Test Nos. I-301 to I-308) to in the 2032-type non-aqueous liquid electrolyte secondary batteries of the comparative examples (Test Nos. I-c31 to I-c34). It is speculated that these results were obtained because at the positive electrode surface in the batteries of the examples, the positive electrode was stabilized by the film formed thereon, and self-decomposition of the positive electrode was suppressed.

4. Discharge Capacity Maintaining Ratio on 500th Cycle ($DCMR_{500}$: Discharge Capacity Maintaining Ratio)

TABLE 1-4

| # | Electrolyte salt | Solvent Kind | Sample compound Kind | mass % | $DCMR_{500}$ (note 4) |
|---|---|---|---|---|---|
| I-401 | $LiPF_6$ 1 mol/L | EC + EMC v/v = ½ | SI-1 | 1 | 94 |
| I-402 | $LiPF_6$ | v/v = ½ | SI-1 | 4 | 92 |
| I-C41 | $LiPF_6$ 1 mol/L | EC + EMC v/v = ½ | — | — | 78 |

(note 4)(Discharge capacity maintaining ratio on 500th cycle/Discharge capacity maintaining ratio on 1st cycle) × 100

As shown in Table 1-4, it was confirmed that the capacity maintaining ratio of the 500th cycle was superior in the 2032-type non-aqueous liquid electrolyte secondary batteries of the examples (Test Nos. I-401 and I-402) to in the 2032-type non-aqueous liquid electrolyte secondary batteries of the comparative examples (Test No. I-c41). It is speculated that these results were obtained because similarly to the case of a graphite negative electrode, reduction proceeded at a potential higher than the insertion potential of lithium ions, and a film having a satisfactory SEI (Solid Electrolyte Interface) was formed on the lithium titanate negative electrode, thereby suppressing decomposition of the liquid electrolyte and deterioration of the electrodes.

Furthermore, even when $LiMn_2O_4$, $LiNi_{0.85}Co_{0.01}Al_{0.05}O_2$, and $LiNi_{0.33}Co_{0.33}Mn_{0.33}O_2$ were used for the positive electrode active material, similarly satisfactory discharge capacity maintaining ratios were exhibited.

Example II

1. Synthesis of Particular Cyclopropane Compound

Synthetic Example II-1

Spirocyclopropane (SII-1)

To a solution of 2.6 g of 1,1-cyclopropanedicarboxylic acid, 2.4 ml of acetic anhydride, and 0.08 ml of sulfuric acid, 2 ml of acetone was added dropwise thereto at 0° C. The mixture was allowed to react for 5 hours at 0° C., and then 30 ml of water was added thereto. A saturated aqueous solution of sodium hydrogen carbonate was added thereto until the mixture reached pH 5, and then a solid thus precipitated was isolated by filtration. Thus, 2.1 g of spiro-cyclopropane (SII-1) was obtained.

Synthetic Example II-2

Spirocyclopropane (SII-2)

Spirocyclopropane (SII-2) was obtained in the same manner as the synthetic example II-1 by using cyclohexanone as a raw material.

Synthetic Example II-3

Spirocyclopropane (SII-7)

7.81 g of N,N-dimethylbarbituric acid, 11.27 g of 1,2-dibromoethane, 13.82 g of potassium carbonate, 0.17 g of tetrabutylammonium hydrogen sulfate, and 70 ml of dimethylformamide were mixed, and the mixture was heated to reflux. The mixture was allowed to react for 4 hours, subsequently the reaction liquid that had been cooled to room temperature was filtered, and the filtrate was concentrated and then purified by silica gel chromatography. Thus, 6.5 g of a spiro-cyclopropane (SII-7) was obtained.

Synthetic Example II-4

Spirocyclopropane (SII-11)

Spirocyclopropane (SII-11) was obtained in the same manner as the synthetic example II-3 by using N,N-diethylthiobarbituric acid as a raw material.

Synthetic Example II-5

Spirocyclopropane (SII-14)

Spirocyclopropane (SII-14) was obtained in the same manner as the synthetic example II-3 by using 1,2-dimethylpyrazolidine-3,5-dione as a raw material.

Examples

2. Preparation of Liquid Electrolyte

To a liquid electrolyte of 1 Methylene carbonate (EC) of $LiPF_6$/ethyl methyl carbonate (EMC) at a volume ratio of 1:2, and a liquid electrolyte at a volume ratio of 1:3, the spyrocyclopropane compound (SII-1) obtained in the synthetic example II-1 was added at a proportion of 0.05% by mass, and thus liquid electrolyte was prepared (Test No. II-101).

Liquid electrolytes were similarly prepared by changing the kinds and the amounts of addition of the cyclopropane compound used as indicated in the table (Test Nos. II-102 to II-111).

A 1 M liquid electrolyte of ethylene carbonate of $LiPF_6$/ethyl methyl carbonate was used as a comparative example. At this time, liquid electrolytes added with vinylene carbonate (VC), the following (RII-1), the following (RII-2), and the following cyclic acid anhydride (RII-3) under the same conditions as in the examples were used as comparative examples.

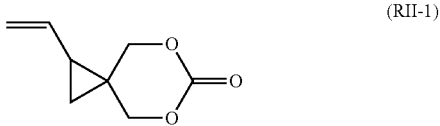
(RII-1)

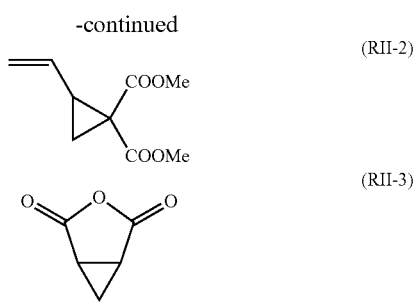

(RII-2)

(RII-3)

[Lithium Secondary Battery]

Lithium secondary batteries for evaluation which used the liquid electrolytes indicated in the following Table 2-1 were produced by using a lithium cobaltate mixture sheet (electrode capacity: 1.5 mAh/cm$^2$; aluminum foil base, 13 mmφ) for the positive electrode, a natural spherical graphite electrode sheet (electrode capacity: 1.6 mAh/cm$^2$; Cu foil base, 14.5 mmφ) for the negative electrode, and a porous film made of PP (thickness: 25 μm, 16 mmφ) for the separator.

<Evaluation of Cycle Characteristic (Discharge Capacity Maintaining Ratio)>

A 2032-type battery produced by the method described above was used, and in a constant temperature chamber at 30° C., the battery was subjected to constant current charging at 0.7 C until the battery voltage reached 4.2 V, subsequently to charging at a constant voltage of 4.2 V until the current value reached 0.06 mA or for 2 hours, and then to constant current discharging at 0.5 C until the battery voltage reached 2.75 V. This was defined as one cycle. This procedure was repeated up to 300 cycles.

<Evaluation of Low Temperature Discharging Rate (Low Temperature Discharging Rate)>

The discharge capacity rate at −20° C. against 30° C. was measured using the 2032-type battery produced by the method described above. In a constant temperature chamber at 30° C., the battery was subjected to constant current charging at 0.1 C until the 0 battery voltage reached 4.2 V, to charging at a constant voltage of 4.2 V until the current value reached 0.06 mA or for 2 hours, and then to constant current discharging at 0.1 C in a constant temperature chamber at −20° C. until the battery voltage reached 2.75 V. Thus, the discharge capacity was measured.

<Positive Electrode Load Characteristic (Load Capacity Maintaining Ratio)>

A positive electrode that had been subjected charging and discharging of 10 cycles in the cycle characteristics test described above was taken out, and a 2032-type battery was produced using lithium for the negative electrode, and a liquid electrolyte of 1 Methylene carbonate of LiPF$_6$/ethyl methyl carbonate at a volume ratio of 1:2. In a constant temperature chamber at 30° C., the battery was subjected to constant current charging at 0.7 C until the battery voltage reached 4.2 V, subsequently to charging at a constant voltage of 4.2 V until the current value reached 0.06 mA or for 2 hours, and then to constant current discharging at 2 C until the battery voltage reached 2.75 V. Thus, a comparison was made for the discharge capacity and the discharge curve.

<Evaluation of Self-Discharging Characteristics (Remaining Capacity Ratio)>

A 2032-type battery produced by the method described above was used, and under an environment at 30° C., the battery was subjected to constant current charging at 0.1 C at 0.4 mA until the battery voltage reached 4.2 V, subsequently charging at a constant voltage of 4.2 V until the current value reached 0.06 mA or for 2 hours, and constant current discharging at 0.1 C until the battery voltage reached 2.75 V. Thus, the initial discharge capacity was measured. Furthermore, the battery was subjected to constant current charging at 0.1 C until the battery voltage reached 4.2 V, and subsequently to charging at a constant voltage of 4.2 V until the current value reached 0.06 mA or for 2 hours, and then the battery was left to stand for 14 days under an environment at 45° C. Thereafter, the battery was taken out into an environment at 30° C., and then the discharge capacity at the time of performing discharge under the same discharging conditions was measured.

<Evaluation of Cycle Characteristic in Li$_4$Ti$_5$O$_{12}$ Negative Electrode (Discharge Capacity Maintaining Ratio)>

A 2032-type battery produced by changing the negative electrode to a lithium titanate mix sheet (electrode capacity: 1.6 mAh/cm$^2$; aluminum foil base, 14.5 mmφ) was used, and in a constant temperature chamber at 30° C., the battery was subjected to constant current charging at 0.7 C until the battery voltage reached 2.8 V, to charging at a constant voltage of 2.8 V until the current value reached 0.06 mA or for 2 hours, and then to constant current discharging at 0.5 C until the battery voltage reached 1.8 V. This was defined as one cycle. This procedure was repeated up to 500 cycles.

<Test Results>

1. Discharge Capacity Maintaining Ratio on 300th Cycle (DCMR$_{300}$: Discharge Capacity Maintaining Ratio)

TABLE 2-1

| # | Electrolyte salt | Solvent Kind | Sample compound Kind | mass % | DCMR$_{300}$[note 1] |
|---|---|---|---|---|---|
| II-101 | LiPF$_6$ | EC + EMC | SII-1 | 0.05 | 80 |
| II-102 | 1 mol/L | v/v = ½ | SII-1 | 0.5 | 82 |
| II-103 | | | SII-1 | 1 | 81 |
| II-104 | | | SII-1 | 4 | 85 |
| II-105 | | | SII-1 | 10 | 83 |
| II-106 | | | SII-2 | 4 | 86 |
| II-107 | | | SII-6 | 4 | 83 |
| II-108 | | | SII-7 | 4 | 82 |
| II-109 | | | SII-9 | 4 | 82 |
| II-110 | | | SII-11 | 4 | 81 |
| II-111 | | | SII-14 | 4 | 83 |
| II-112 | | | SII-12 | 1 | 82 |
| II-113 | | | SII-13 | 1 | 81 |
| II-c11 | LiPF$_6$ | EC + EMCf | — | — | <20 |
| II-c12 | 1 mol/L | v/v = ½ | VC | 1 | 69 |
| II-c13 | | | VC | 3 | 67 |
| II-c14 | | | RII-1 | 1 | <20 |
| II-c15 | | | RII-2 | 1 | <20 |
| II-c16 | | | RII-3 | 1 | <20 |

[note 1] Discharge capacity maintaining ratio (%) = (Discharge capacity maintaining ratio on 300th cycle/Discharge capacity maintaining ratio on 1st cycle) × 100

As shown in Table 2-1, it was confirmed that the capacity maintaining ratio of the 300th cycle was superior in the 2032-type non-aqueous liquid electrolyte secondary batteries of the examples (Test Nos. II-101 to II-113) to in the 2032-type non-aqueous liquid electrolyte secondary batteries of the comparative examples (Test Nos. II-c11 to II-c16). It is speculated that these results were obtained because in the negative electrodes related to the batteries of the examples, the cyclopropane compound added to the liquid electrolyte received electrons from the negative electrode and was ring-opening polymerized to form a film having a satisfactory SEI (Solid Electrolyte Interface) on the surface of the negative electrode, and thereby decomposition of the liquid electrolyte was suppressed.

Furthermore, even when $LiMn_2O_4$, $LiNi_{0.85}Co_{0.01}Al_{0.05}O_2$, and $LiNi_{0.33}Co_{0.33}Mn_{0.33}O_2$ were used for the positive electrode active material, similarly satisfactory discharge capacity maintaining ratios were exhibited.

2. LTDR: Low Temperature Discharging Rate

TABLE 2-2

| # | Electrolyte salt | Kind | Solvent Sample compound Kind | mass % | LTDR[note 2] |
|---|---|---|---|---|---|
| II-201 | | | SII-1 | 1 | 79 |
| II-202 | | | SII-1 | 4 | 81 |
| II-203 | | | SII-2 | 4 | 82 |
| II-204 | LiPF$_6$ | EC + EMC | SII-6 | 4 | 79 |
| II-205 | 1 mol/L | v/v = 1/3 | SII-7 | 4 | 80 |
| II-206 | | | SII-9 | 4 | 79 |
| II-207 | | | SII-11 | 4 | 80 |
| II-208 | | | SII-12 | 1 | 79 |
| II-209 | | | SII-13 | 1 | 79 |
| II-c21 | LiPF$_6$ | EC + EMC | — | — | 55 |
| II-c22 | 1 mol/L | v/v = 1/3 | VC | 1 | 58 |
| II-c23 | | | RII-2 | 1 | 40 |
| II-c24 | | | RII-3 | 1 | 54 |

[note 2] Low temperature discharging rate (%) = (Discharge capacity at −20° C./Discharge capacity at −30° C.) × 100

As shown in Table 2-2, it was confirmed that the low temperature discharging rate was superior in the 2032-type non-aqueous liquid electrolyte secondary batteries of the examples (Test Nos. II-201 to II-209) to in the 2032-type non-aqueous liquid electrolyte secondary batteries of the comparative examples (Test Nos. II-c21 to II-c24). It is speculated that these results were obtained because in the SEI films formed on the negative electrode surface related to the batteries of the examples, lithium ions were stabilized, causing an increase in the lithium ion conductivity in the film (SEI), and the resistance to boundary surface movement was decreased.

3. LCCMR: Load-Carrying Capacity Maintaining Ratio . . . Positive Electrode Load Characteristic

TABLE 2-3

| # | Electrolyte salt | Kind | Solvent Sample compound Kind | mass % | LCCMR[note 3] |
|---|---|---|---|---|---|
| II-301 | LiPF$_6$ | EC + EMC | SII-1 | 4 | 97 |
| II-302 | 1 mol/L | v/v = 1/2 | SII-7 | 4 | 93 |
| II-303 | | | SII-11 | 4 | 95 |
| II-c31 | LiPF$_6$ | EC + EMC | — | — | 76 |
| II-c32 | 1 mol/L | v/v = 1/2 | VC | 1 | 81 |
| II-c33 | | | VC | 4 | 78 |
| II-c34 | | | RII-1 | 4 | 75 |
| II-c35 | | | RII-2 | 4 | 73 |
| II-c36 | | | RII-3 | 4 | 73 |

[note 3] Load-carrying capacity maintaining ratio (%) = (2 C Discharge capacity/Discharge capacity at the initial period) × 100

As shown in Table 2-3, it was confirmed that the load characteristics were superior in the 2032-type non-aqueous liquid electrolyte secondary batteries of the examples (Test Nos. II-301 to II-303) to in the 2032-type non-aqueous liquid electrolyte secondary batteries of the comparative examples (Test Nos. II-c31 to II-c36). It is speculated that these results were obtained because on the positive electrode surface in the batteries of the examples, a film based on the spiro-cyclopropane compound added thereto was formed, thereby the positive electrode was stabilized by the film thus formed, and the resistance of the positive electrode interface was suppressed.

Figure 3:
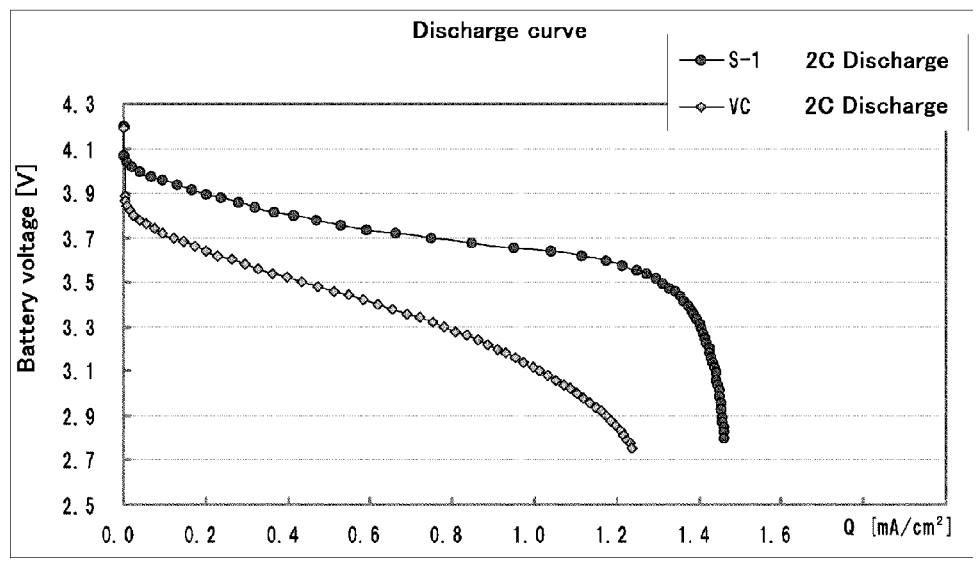
FIG. 3 is a graph illustrating the discharge curves of Test Nos. II-301 and II-c32 of Examples.

Furthermore, as shown in FIG. 3, the discharge curve for the secondary battery of the example (No. II-301) was closer to ideality, in which a high voltage was maintained up to a high current region, as compared with the comparative example (No. II-c32).

4. RCR: Remaining Capacity Ratio

TABLE 2-4

| # | Electrolyte salt | Kind | Solvent Sample compound Kind | mass % | RCR[note 4] |
|---|---|---|---|---|---|
| II-401 | LiPF$_6$ | EC + EMC | SII-1 | 1 | 90 |
| II-402 | 1 mol/L | v/v = 1/2 | SII-1 | 4 | 92 |
| II-403 | | | SII-2 | 4 | 93 |
| II-404 | | | SII-6 | 4 | 83 |
| II-405 | | | SII-7 | 4 | 91 |
| II-406 | | | SII-9 | 4 | 87 |
| II-407 | | | SII-11 | 4 | 82 |
| II-408 | | | SII-12 | 1 | 88 |
| II-409 | | | SII-13 | 1 | 87 |
| II-c41 | LiPF$_6$ | EC + EMC | — | — | 76 |
| II-c42 | 1 mol/L | v/v = 1/2 | VC | 1 | 79 |
| II-c43 | | | RII-2 | 1 | 77 |
| II-c44 | | | RII-3 | 1 | 64 |

[note 4] Remaining capacity ratio (%) = (Discharge capacity after being left in 14 days/Discharge capacity at the initial period) × 100

As shown in Table 2-4, it was confirmed that the self-discharge characteristics were superior in the 2032-type non-aqueous liquid electrolyte secondary batteries of the examples (Test Nos. II-401 to II-409) to in the 2032-type non-aqueous liquid electrolyte secondary batteries of the comparative examples (Test Nos. II-c41 to II-c44). It was speculated that these results were obtained because on the positive electrode surface in the batteries of the examples, the positive electrode was stabilized by the film formed thereon, and self-decomposition of the positive electrode was suppressed.

5. Discharge Capacity Maintaining Ratio on 500th Cycle (DCMR$_{500}$: Discharge Capacity Maintaining Ratio)

TABLE 2-5

| # | Electrolyte salt | Kind | Solvent Sample compound Kind | mass % | DCMR$_{500}$[note 5] |
|---|---|---|---|---|---|
| II-501 | LiPF$_6$ | EC + EMC | SII-1 | 1 | 91 |
| II-502 | 1 mol/L | v/v = 1/2 | SII-1 | 4 | 92 |
| II-c51 | LiPF$_6$ 1 mol/L | EC + EMC v/v = 1/2 | — | — | 78 |

[note 5] Discharge capacity maintaining ratio (%) = (Discharge capacity on 500th cycle/Discharge capacity on 1st cycle) × 100

As shown in Table 2-5, it was confirmed that the capacity maintaining ratio of the 500$^{th}$ cycle was superior in the 2032-type non-aqueous liquid electrolyte secondary batteries of the examples (Test Nos. II-501 and II-502) to in the 2032-type non-aqueous liquid electrolyte secondary batteries of the comparative examples (Test No. II-c51). It is speculated that these results were obtained because similarly to the case of a graphite negative electrode, reduction proceeded at a potential higher than the insertion potential of lithium ions, and a film having a satisfactory SEI (Solid Electrolyte Interface) was formed on the lithium titanate negative electrode, thereby suppressing decomposition of the liquid electrolyte and deterioration of the electrodes.

Furthermore, even when $LiMn_2O_4$, $LiNi_{0.85}Co_{0.01}Al_{0.05}O_2$, and $LiNi_{0.33}Co_{0.33}Mn_{0.33}O_2$ were used for the positive electrode active material, similarly satisfactory discharge capacity maintaining ratios were exhibited.

Example III

Synthetic Example III-1

Lactone Ring-Fused Cyclopropane (SIII-1)

A solution of 1.89 g of $NaBH_4$ in 70 ml of tetrahydrofuran (THF) was cooled to 0° C., a solution of 5.6 g of 3-oxabicyclo[3.1.0]hexane-2,4-dione in 80 ml of THF was added dropwise thereto, and the mixture was allowed to react for 3 hours. After completion of the reaction, 6 N HCl was added thereto until the mixture reached pH 2, and the mixture was subjected to extraction with t-butyl methyl ether and concentration. 100 ml of toluene and 0.2 g of p-toluenesulfonic acid were added to an organic material thus obtained, and the mixture was heated to reflux for one hour. The resultant was washed with water, extracted with t-butyl methyl ether, and concentrated. Subsequently, the product was purified by silica gel column chromatography, and thus 3.1 g of a lactone ring-fused cyclopropane compound (SIII-1) was obtained.

Synthetic Example III-2

Lactone Ring-Fused Cyclopropane (SIII-3)

Lactone ring-fused cyclopropane compound (SIII-3) was obtained in the same manner as the synthetic example III-1 by using 1-methyl-3-oxabicyclo[3.1.0]hexan-2,4-dione as a raw material.

Synthetic Example III-3

Lactone Ring-Fused Cyclopropane (SIII-5)

100 ml of toluene and 0.2 g of p-toluenesulfonic acid were added to 5 g of cyclopropane, and the mixture was heated to reflux for one hour. The resultant was washed with water, extracted with t-butyl methyl ether, and concentrated. Subsequently, the product was purified by silica gel column chromatography, and thus 3.8 g of a lactone ring-fused cyclopropane compound (SIII-5) was obtained.

Synthetic Example III-4

Lactone Ring-Fused Cyclopropane (SIII-6)

To 6.63 g of allyl acetoacetate, 25 g of manganese(III) acetate, 8.47 g of copper(II) acetate, 9.15 g of potassium acetate, and 115 ml of acetic acid were added, and the mixture was allowed to react for one hour at 75° C. After completion of the reaction, the reaction mixture was neutralized with an aqueous solution of sodium hydrogen carbonate, extracted with ethyl acetate, and concentrated. Subsequently, the product was purified by silica gel column chromatography, and thus 2.8 g of a lactone ring-fused cyclopropane compound (SIII-6) was obtained.

Synthetic Example III-5

Lactone Ring-Fused Cyclopropane (SIII-7)

Lactone ring-fused cyclopropane compound (SIII-7) was obtained in the same manner as the synthetic example III-4 by using allylmethylmalonate ester as a raw material.

Synthetic Example III-6

Lactone Ring-Fused Cyclopropane (SIII-8)

Lactone ring-fused cyclopropane compound (SIII-8) was obtained in the same manner as the synthetic example III-5 by using allyl cyanoacetate as a raw material.

Synthetic Example III-7

Lactone Ring-Fused Cyclopropane (SIII-10)

1.25 g of sodium hydride was added to 50 ml of THF, and the mixture was cooled in an ice bath. In the reaction vessel, a solution prepared by adding 10 ml of THF to 8.8 g of diethyl malonate was added dropwise, and the mixture was stirred for 15 minutes. Thereafter, 8.15 g of α-bromobutenolide was added thereto, the mixture was returned to room temperature, and then the mixture was stirred for 5 hours. After completion of the reaction, the reaction mixture was quenched with a saturated aqueous solution of ammonium chloride, extracted with ethyl acetate, and concentrated. The product was purified by silica gel column chromatography, and thus 6.5 g of a lactone ring-fused cyclopropane compound (SII)-10) was obtained.

Examples

2. Preparation of Liquid Electrolyte

To a liquid electrolyte of 1 Methylene carbonate (EC) of $LiPF_6$/ethyl methyl carbonate (EMC) at a volume ratio of 1:2, and a liquid electrolyte at a volume ratio of 1:3, the lactone ring-fused cyclopropane compound (SIII-1) obtained in the synthetic example III-1 was added at a proportion of 0.05% by mass, and thus liquid electrolyte was prepared (Test No. III-101). With respect to Test Nos. 102 and Nos. after 102, liquid electrolytes were similarly prepared by changing the kinds and the amounts of addition of the particular cyclopropane compound used as indicated in the table (Test Nos. III-102 to III-114).

A 1 M liquid electrolyte of ethylene carbonate of $LiPF_6$/ethyl methyl carbonate was used as a comparative example. At this time, liquid electrolytes added with vinylene carbonate (VC), the following (RIII-1), the following (RIII-2), and the following cyclic acid anhydride (RIII-3) under the same conditions as in Test No. III-101 were used as comparative examples.

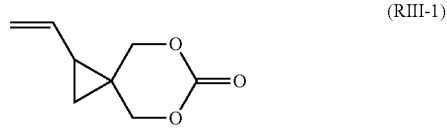

(RIII-1)

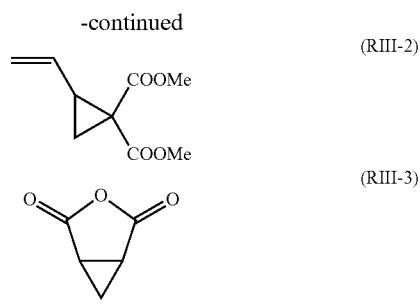

[Lithium Secondary Battery]

Lithium secondary batteries for evaluation which used the liquid electrolytes indicated in the following Table were produced by using a lithium cobaltate mixture sheet (electrode capacity: 1.5 mAh/cm², aluminum foil base, 13 mmϕ) for the positive electrode, a natural spherical graphite electrode sheet (electrode capacity: 1.6 mAh/cm²; Cu foil base, 14.5 mmϕ) for the negative electrode, and a porous film made of PP (thickness: 25 μm, 16 mmϕ) for the separator.

<Evaluation of Cycle Characteristic (Discharge Capacity Maintaining Ratio)>

A 2032-type battery produced by the method described above was used, and in a constant temperature chamber at 30° C., the battery was subjected to constant current charging at 0.7 C until the battery voltage reached 4.2 V, subsequently to charging at a constant voltage of 4.2 V until the current value reached 0.06 mA or for 2 hours, and then to constant current discharging at 0.5 C until the battery voltage reached 2.75 V. This was defined as one cycle. This procedure was repeated up to 300 cycles.

<Evaluation of Low Temperature Discharging Rate (Low Temperature Discharging Rate)>

The discharge capacity rate at −20° C. against 30° C. was measured using a 2032-type battery produced by the method described above. In a constant temperature chamber at 30° C., the battery was subjected to constant current charging at 0.1 C until the battery voltage reached 4.2 V, to charging at a constant voltage of 4.2 V until the current value reached 0.06 mA or for 2 hours, and then to constant current discharging at 0.1 C in a constant temperature chamber at −20° C. until the 0 battery voltage reached 2.75 V. Thus, the discharge capacity was measured.

<Positive Electrode Load Characteristic (Load Capacity Maintaining Ratio)>

A positive electrode that had been subjected charging and discharging of 10 cycles in the cycle characteristics test described above was taken out, and a 2032-type battery was produced using lithium metal for the negative electrode, and a liquid electrolyte of 1 Methylene carbonate of LiPF₆/ethyl methyl carbonate at a volume ratio of 1:2. In a constant temperature chamber at 30° C., the battery was subjected to constant current charging at 0.7 C until the battery voltage reached 4.2 V, subsequently to charging at a constant voltage of 4.2 V until the current value reached 0.06 mA or for 2 hours, and then to constant current discharging at 2 C until the battery voltage reached 2.75 V. Thus, a comparison was made for the discharge capacity and the discharge curve.

<Evaluation of Self-Discharging Characteristic (Remaining Capacity Ratio)>

A 2032-type battery produced by the method described above was used, and under an environment at 30° C., the battery was subjected to constant current charging at 0.1 C at 0.4 mA until the battery voltage reached 4.2 V, subsequently charging at a constant voltage of 4.2 V until the current value reached 0.06 mA or for 2 hours, and constant current discharging at 0.1 C until the battery voltage reached 2.75 V. Thus, the initial discharge capacity was measured. Furthermore, the battery was subjected to constant current charging at 0.1 C until the battery voltage reached 4.2 V, and subsequently to charging at a constant voltage of 4.2 V until the current value reached 0.06 mA or for 2 hours, and then the battery was left to stand for 14 days in an environment at 45° C. Thereafter, the battery was taken out into an environment at 30° C., and then the discharge capacity at the time of performing discharge under the same discharging conditions was measured.

<Evaluation of Cycle Characteristic in Li₄Ti₅O₁₂ Negative Electrode (Discharge Capacity Maintaining Ratio)>

A 2032-type battery produced by changing the negative electrode to a lithium titanate mix sheet (electrode capacity: 1.6 mAh/cm²; aluminum foil base, 14.5 mmϕ) was used, and in a constant temperature chamber at 30° C., the battery was subjected to constant current charging at 0.7 C until the battery voltage reached 2.8 V, to charging at a constant voltage of 2.8 V until the current value reached 0.06 mA or for 2 hours, and then to constant current discharging at 0.5 C until the battery voltage reached 1.8 V. This was defined as one cycle. This procedure was repeated up to 500 cycles.

<Test Results>

1. Discharge Capacity Maintaining Ratio on 300th Cycle (DCMR₃₀₀: Discharge Capacity Maintaining Ratio)

TABLE 3-1

| # | Electrolyte salt | Solvent Kind | Sample compound Kind | mass % | DCMR$_{300}$(note 1) |
|---|---|---|---|---|---|
| III-101 | LiPF₆ | EC + EMC | SIII-1 | 0.05 | 81 |
| III-102 | 1 mol/L | v/v = ½ | SIII-1 | 0.5 | 81 |
| III-103 | | | SIII-1 | 1 | 85 |
| III-104 | | | SIII-1 | 4 | 88 |
| III-105 | | | SIII-1 | 10 | 84 |
| III-106 | | | SIII-3 | 4 | 83 |
| III-107 | | | SIII-5 | 4 | 81 |
| III-108 | | | SIII-6 | 1 | 80 |
| III-109 | | | SIII-6 | 4 | 80 |
| III-110 | | | SIII-7 | 1 | 85 |
| III-111 | | | SIII-7 | 4 | 84 |
| III-112 | | | SIII-8 | 1 | 85 |
| III-113 | | | SIII-8 | 4 | 83 |
| III-114 | | | SIII-10 | 4 | 81 |
| III-115 | | | SIII-19 | 1 | 80 |
| III-116 | | | SIII-21 | 0.5 | 81 |
| III-117 | | | SIII-11 | 1 | 83 |
| III-118 | | | SIII-15 | 1 | 83 |
| III-119 | | | SIII-16 | 1 | 85 |
| III-c11 | LiPF₆ | EC + EMC | — | — | <20 |
| III-c12 | 1 mol/L | v/v = ½ | VC | 1 | 69 |
| III-c13 | | | VC | 3 | 67 |
| III-c14 | | | RIII-1 | 1 | <20 |
| III-c15 | | | RIII-2 | 1 | <20 |
| III-c16 | | | RIII-3 | 1 | <20 |

(note 1) Discharge capacity maintaining ratio (%) = (Discharge capacity maintaining ratio on 300th cycle/Discharge capacity maintaining ratio on 1st cycle) × 100

As shown in Table 3-1, it was confirmed that the capacity maintaining ratio of the 300th cycle was superior in the 2032-type non-aqueous liquid electrolyte secondary batteries of the examples (Test Nos. III-101 to III-109) to in the 2032-type non-aqueous liquid electrolyte secondary batteries of the comparative examples (Test Nos. III-c11 to III-c16). It is speculated that these results were obtained because in the negative electrodes related to the batteries of the examples, the lactone ring-fused cyclopropane compound added to the liquid electrolyte received electrons from the negative electrode and was ring-opening polymerized to form a film having a satisfactory SEI (Solid Electrolyte Interface) on the surface of the negative electrode, and thereby decomposition of the liquid electrolyte was suppressed.

Furthermore, even when $LiMn_2O_4$, $LiNi_{0.85}Co_{0.01}Al_{0.05}O_2$, and $LiNi_{0.33}Co_{0.33}Mn_{0.33}O_2$ were used for the positive electrode active material, similarly satisfactory discharge capacity maintaining ratios were exhibited.

2. LTDR: Low Temperature Discharging Rate

TABLE 3-2

| | Electrolyte | | Solvent | | |
|---|---|---|---|---|---|
| | | | Sample compound | | |
| # | salt | Kind | Kind | mass % | LTDR[note 2] |
| III-201 | LiPF$_6$ | EC + EMC | SIII-1 | 1 | 81 |
| III-202 | 1 mol/L | v/v = 1/3 | SIII-1 | 4 | 82 |
| III-203 | | | SIII-3 | 4 | 79 |
| III-204 | | | SIII-5 | 4 | 78 |
| III-205 | | | SIII-6 | 4 | 75 |
| III-206 | | | SIII-7 | 4 | 77 |
| III-207 | | | SIII-8 | 4 | 80 |
| III-208 | | | SIII-11 | 1 | 78 |
| III-209 | | | SIII-15 | 1 | 77 |
| III-210 | | | SIII-16 | 1 | 81 |
| III-c21 | LiPF$_6$ | EC + EMC | — | — | 55 |
| III-c22 | 1 mol/L | v/v = 1/3 | VC | 1 | 58 |
| III-c23 | | | RIII-2 | 1 | 40 |
| III-c24 | | | RIII-3 | 1 | 54 |

[note 2]Low temperature discharging rate (%) = (Discharge capacity at −20° C./Discharge capacity at −30° C.) × 100

As shown in Table 3-2, it was confirmed that the low temperature discharging rate was superior in the 2032-type non-aqueous liquid electrolyte secondary batteries of the examples (Test Nos. III-201 to III-210) to in the 2032-type non-aqueous liquid electrolyte secondary batteries of the comparative examples (Test Nos. III-c21 to III-c24). It is speculated that these results were obtained because in the SEI films formed on the negative electrode surface related to the batteries of the examples, lithium ions were stabilized, causing an increase in the lithium ion conductivity in the film (SEI), and the resistance to boundary surface movement was decreased.

3. LCCMR: Load-Carrying Capacity Maintaining Ratio . . . Positive Electrode Load

TABLE 3-3

| | Electrolyte | | Solvent | | |
|---|---|---|---|---|---|
| | | | Sample compound | | |
| # | salt | Kind | Kind | mass % | LCCMR[note 3] |
| III-301 | LiPF$_6$ | EC + EMC | SIII-1 | 4 | 94 |
| III-302 | 1 mol/L | v/v = 1/2 | SIII-7 | 4 | 91 |
| III-303 | | | SIII-8 | 4 | 93 |
| III-c31 | LiPF$_6$ | EC + EMC | — | — | 76 |
| III-c32 | 1 mol/L | v/v = 1/2 | VC | 1 | 81 |
| III-c33 | | | VC | 4 | 78 |
| III-c34 | | | RIII-1 | 4 | 75 |
| III-c35 | | | RIII-2 | 4 | 73 |
| III-c36 | | | RIII-3 | 4 | 73 |

[note 3]Load-Carrying Capacity Maintaining Ratio (%) = (2 C Discharge capacity/Discharge capacity at the initial period) × 100

As shown in Table 3-3, it was confirmed that the load characteristics were superior in the 2032-type non-aqueous liquid electrolyte secondary batteries of the examples (Test Nos. III-301 to III-303) to in the 2032-type non-aqueous liquid electrolyte secondary batteries of the comparative examples (Test Nos. III-c31 to III-c36). It is speculated that these results were obtained because on the positive electrode surface in the batteries of the examples, a film based on the lactone ring-fused cyclopropane was formed, thereby the positive electrode was stabilized by the film thus formed, and the resistance of the positive electrode interface was suppressed.

Figure 4:
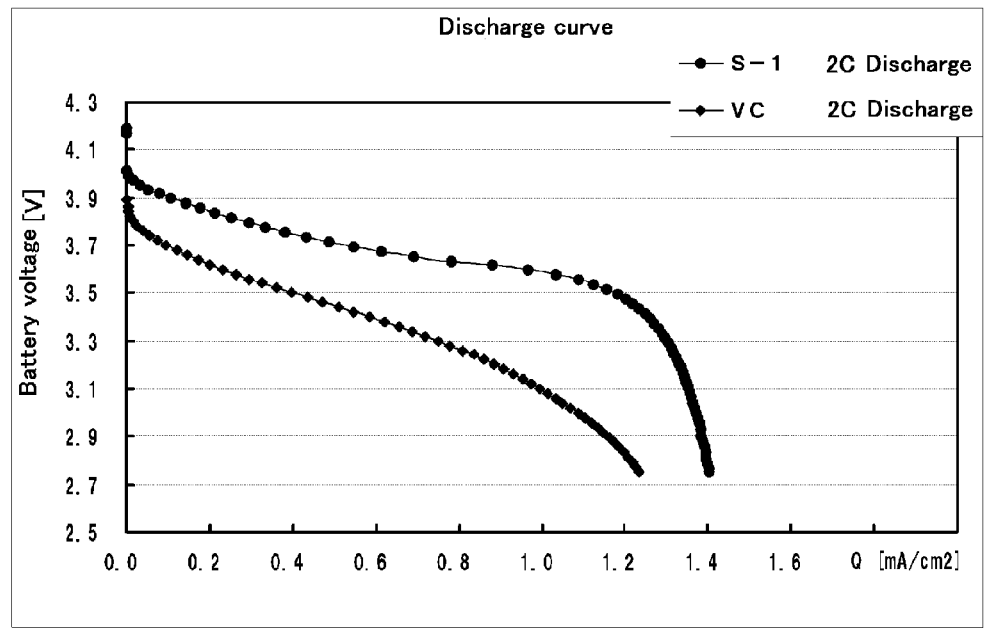
FIG. 4 is a graph illustrating the discharge curves of Test Nos. III-301 and III-c32 of Examples.

Furthermore, as shown in FIG. 4, the discharge curve for the secondary battery of the example (No. III-301) was closer to ideality, in which a high voltage was maintained up to a high current region, as compared with the comparative example (No. III-c32).

4. RCR: Remaining Capacity Ratio

TABLE 3-4

| | Electrolyte | | Solvent | | |
|---|---|---|---|---|---|
| | | | Sample compound | | |
| # | salt | Kind | Kind | mass % | RCR[note 4] |
| III-401 | LiPF$_6$ | EC + EMC | SIII-1 | 1 | 91 |
| III-402 | 1 mol/L | v/v = 1/2 | SIII-1 | 4 | 93 |
| III-403 | | | SIII-3 | 4 | 86 |
| III-404 | | | SIII-5 | 4 | 88 |
| III-405 | | | SIII-6 | 4 | 83 |
| III-406 | | | SIII-7 | 4 | 89 |
| III-407 | | | SIII-8 | 4 | 90 |
| III-408 | | | SIII-11 | 1 | 86 |
| III-409 | | | SIII-15 | 1 | 89 |
| III-410 | | | SIII-16 | 1 | 90 |
| III-c41 | LiPF$_6$ | EC + EMC | — | — | 76 |
| III-c42 | 1 mol/L | v/v = 1/2 | VC | 1 | 79 |
| III-c43 | | | RIII-2 | 1 | 77 |
| III-c44 | | | RIII-3 | 1 | 64 |

[note 4]Remaining Capacity Ratio (%) = (Discharge capacity after being left in 14 days/Discharge capacity at the initial period) × 100

As shown in Table 3-4, it was confirmed that the self-discharge characteristics were superior in the 2032-type non-aqueous liquid electrolyte secondary batteries of the examples (Test Nos. III-401 to III-410) to in the 2032-type non-aqueous liquid electrolyte secondary batteries of the comparative examples (Test Nos. III-c41 to III-c44). It was speculated that these results were obtained because on the positive electrode surface in the batteries of the examples, the positive electrode was stabilized by the film formed thereon, and self-decomposition of the positive electrode was suppressed.

5. Discharge Capacity Maintaining Ratio on 500th Cycle (DCMR$_{500}$: Discharge Capacity Maintaining Ratio)

TABLE 3-5

| | Electrolyte | | Solvent | | |
|---|---|---|---|---|---|
| | | | Sample compound | | |
| # | salt | Kind | Kind | mass % | DCMR$_{500}$[note 5] |
| III-501 | LiPF$_6$ | EC + EMC | SIII-1 | 1 | 93 |
| III-502 | 1 mol/L | v/v = 1/2 | SIII-1 | 4 | 96 |
| III-503 | | | SIII-19 | 1 | 90 |
| III-504 | | | SIII-21 | 0.5 | 91 |

TABLE 3-5-continued

| | Electrolyte salt | Solvent Kind | Sample compound Kind | mass % | DCMR$_{500}$(note 5) |
|---|---|---|---|---|---|
| III-c51 | LiPF$_6$ 1 mol/L | EC + EMC v/v = ½ | — | — | 78 |

(note 5)Discharge capacity maintaining ratio (%) = (Discharge capacity maintaining ratio on 500th cycle/Discharge capacity maintaining ratio on 1st cycle) × 100

As shown in Table 3-5, it was confirmed that the capacity maintaining ratio of the 500th cycle was superior in the 2032-type non-aqueous liquid electrolyte secondary batteries of the examples (Test Nos. III-501 to III-504) to in the 2032-type non-aqueous liquid electrolyte secondary batteries of the comparative examples (Test No. III-c51). It is speculated that these results were obtained because similarly to the case of a graphite negative electrode, reduction proceeded at a potential higher than the insertion potential of lithium ions, and a film having a satisfactory SEI (Solid Electrolyte Interface) was formed on the lithium titanate negative electrode, thereby suppressing decomposition of the liquid electrolyte and deterioration of the electrodes.

Furthermore, even when LiMn$_2$O$_4$, LiNi$_{0.85}$Co$_{0.01}$Al$_{0.05}$O$_2$, and LiNi$_{0.33}$Co$_{0.33}$Mn$_{0.33}$O$_2$ were used for the positive electrode active material, similarly satisfactory discharge capacity maintaining ratios were exhibited.

In the Examples described above, it was described that batteries using the liquid electrolyte of the present invention in combination with a lithium titanium oxide negative electrode or a carbon material negative electrode as a negative electrode, and lithium nickel-manganese-cobaltate, lithium cobaltate or lithium manganate as a positive electrode, exhibited excellent characteristics. However, it can be speculated that the liquid electrolyte of the present invention also exhibits the same excellent effect in batteries using a negative electrode of a metal or metal oxide capable of forming an alloy with lithium under development for high capacity (preferably Si, Si oxide, Si/Si oxide, Sn, Sn oxide, SnB$_x$P$_y$O$_7$, Cu/Sn, and plural composites among these), and a composite of such a metal or metal oxide and a carbon material as a negative electrode, and/or batteries using a positive electrode of 4.5 V to 5 V class.

Having described our invention as related to the present embodiments, it is our intention that the invention not be limited by any of the details of the description, unless otherwise specified, but rather be construed broadly within its spirit and scope as set out in the accompanying claims.

This non-provisional application claims priorities under 35 U.S.C. §119 (a) on Patent Application No. 2011-237989 filed in Japan on Oct. 28, 2011, Patent Application No. 2011-237990 filed in Japan on Oct. 28, 2011, and Patent Application No. 2011-237991 filed in Japan on Oct. 28, 2011, each of which is entirely herein incorporated by reference.

REFERENCE SIGNS LIST

1 Current collector for positive electrode
2 Positive electrode active material layer
3 Current collector for negative electrode
4 Negative electrode active material layer
5 Liquid electrolyte
6 Operating means
7 Circuit wiring
9 Separator
10 Lithium ion secondary battery
12 Separator
14 Positive electrode sheet
16 Negative electrode sheet
18 Packaging can double as a negative electrode
20 Insulating plate
22 Opening sealing plate
24 Positive electrode current collector
26 Gasket
28 Pressure-sensitive valve body
30 Current blocking element
100 Bottomed cylindrical lithium secondary battery

The invention claimed is:

1. A non-aqueous liquid electrolyte for a secondary battery, comprising:
an electrolyte;
at least one or more cyclopropane compound selected from the group consisting of a compound represented by the following formula (I-1), a compound represented by the following formula (II-2), and a compound represented by the following formula (III-1'), in an organic solvent,

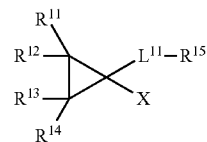

(I-1)

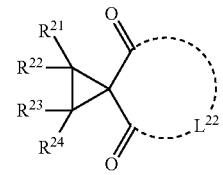

(II-2)

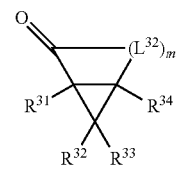

(III-1')

wherein, in formula (I-1), $R^{11}$ to $R^{14}$ each independently represent a hydrogen atom, an alkyl group, an aryl group, an alkoxy group, a fluorine atom, a group containing an carbonyl group, or a cyano group; $R^{15}$ represents a substituent having 1 to 7 carbon atoms which may have an oxygen atom, an nitrogen atom, or a sulfur atom; $L^{11}$ represents an alkylene group or a carbonyl group; X represents a cyano group or an alkoxycarbonyl group as an electron-withdrawing group having a Hammett substituent constant $\sigma_p$ value of 0 or more;
wherein, in formula (II-2), $R^{21}$ to $R^{24}$ each independently represent a hydrogen atom or a substituent; and $L^{22}$ represents a group of atoms for forming a 5- or 6-membered ring structure with a carbonyl group and a carbon atom of a cyclopropyl group; and
wherein, in formula (III 1'), $R^{31}$ to $R^{34}$ each independently represent a hydrogen atom or a substituent; $L^{32}$ represents an unsubstituted or methyl- or ethyloxy-substituted alkylene group, an oxygen atom, a sulfur atom, —SO$_2$—, or —NR$^{35}$—; R$^{35}$ represents an alkyl group or an aryl group; and m represents 1 or 2.

2. The non-aqueous liquid electrolyte for a secondary battery according to claim 1, wherein the cyclopropane compound is represented by the formula (I-1).

3. The non-aqueous liquid electrolyte for a secondary battery according to claim 1, wherein the cyclopropane compound is represented by formula (I-1), and R$^{11}$ to R$^{14}$ in formula (I-1) represent a hydrogen atom.

4. The non-aqueous liquid electrolyte for a secondary battery according to claim 1, wherein the cyclopropane compound is represented by the formula (I-1), and the substituent X in formula (I-1) represents a cyano group.

5. The non-aqueous liquid electrolyte for a secondary battery according to claim 1, wherein the cyclopropane compound is represented by for the formula (I-1), L$^{11}$-R$^{15}$ in formula (I-1) represents —COOR$^{16}$, and
wherein R$^{16}$ represents an alkyl group having 1 to 6 carbon atoms, in which a carbonyl group (—CO—), an ether group (—O—) or an imino group (—NR$^{17}$—) may intervene; and R$^{17}$ represents a hydrogen atom or an alkyl group.

6. The non-aqueous liquid electrolyte for a secondary battery according to claim 1, wherein the cyclopropane compound is represented by the formula (III-1') and L$^{32}$ in formula (III-1') is an alkylene group, an oxygen atom, a sulfur atom, or —NR$^{35}$—.

7. The non-aqueous liquid electrolyte for a secondary battery according to claim 1, wherein the cyclopropane compound is represented by the formula (III-1'), and L$^{32}$ in formula (III-1') is an alkylene group having 1 to 3 carbon atoms.

8. The non-aqueous liquid electrolyte for a secondary battery according to claim 1, wherein the cyclopropane compound is represented by the formula (III-1'), and L$^{32}$ in formula (III-1') is a methylene group.

9. The non-aqueous liquid electrolyte for a secondary battery according to claim 1, wherein the electrolyte is a lithium salt.

10. The non-aqueous liquid electrolyte for a secondary battery according to claim 1, wherein the cyclopropane compound is applied in an amount in the range of 0.005% to 20% by mass relative to the total amount of the liquid electrolyte.

11. The non-aqueous liquid electrolyte for a secondary battery according to claim 1, wherein a cyclic carbonate, a chain-like carbonate, or a cyclic ester is employed as the organic solvent.

12. A lithium secondary battery, comprising:
the non-aqueous liquid electrolyte for a secondary battery according to claim 1;
a positive electrode; and
a negative electrode.

13. The secondary battery according to claim 12, wherein lithium titanate is applied as an active material for the negative electrode.

14. A kit of a non-aqueous liquid electrolyte for a secondary battery, using a first agent and a second agent in mixture,
wherein the kit contains the non-aqueous liquid electrolyte, the first agent contains an electrolyte, and the second agent contains a cyclopropane compound represented by the following formula (I-1), formula (II-2) or formula (III 1'):

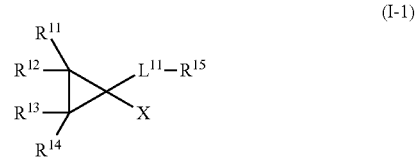

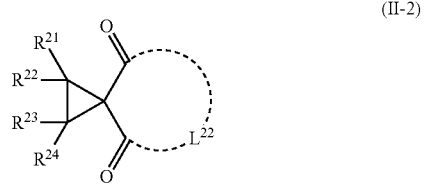

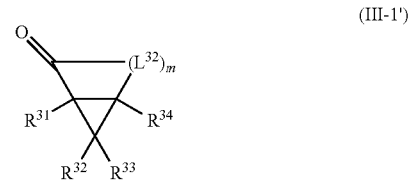

wherein, in formula (I-1), R$^{11}$ to R$^{14}$ each independently represent a hydrogen atom, an alkyl group, an aryl group, an alkoxy group, a fluorine atom, a group containing an carbonyl group, or a cyano group; R$^{15}$ represents a substituent having 1 to 7 carbon atoms which may have an oxygen atom, an nitrogen atom, or a sulfur atom; L$^{11}$ represents an alkylene group or a carbonyl group; X represents a cyano group or an alkoxycarbonyl group as an electron-withdrawing group having a Hammett substituent constant σp value of 0 or more;

wherein, in formula (II-2), R$^{21}$ to R$^{24}$ each independently represent a hydrogen atom or a substituent; and L$^{22}$ represents a group of atoms for forming a 5- or 6-membered ring structure with a carbonyl group and a carbon atom of a cyclopropyl group; and wherein, in formulae (III 1'), R$^{31}$ to R$^{34}$ each independently represent a hydrogen atom or a substituent; L$^{32}$ represents an unsubstituted or methyl- or ethyloxy-substituted alkylene group, an oxygen atom, a sulfur atom, —SO$_2$—, or —NR$^{35}$—; R$^{35}$ represents an alkyl group or an aryl group; and m represents 1 or 2.

* * * * *